Dec. 7, 1943.                L. F. ATHY ET AL                2,336,053
              METHOD OF MAKING GEOPHYSICAL EXPLORATIONS
                    Filed March 11, 1940      25 Sheets-Sheet 1

INVENTORS
Lawrence F. Athy
Elton V. McCollum
BY
ATTORNEY

Dec. 7, 1943.   L. F. ATHY ET AL   2,336,053
METHOD OF MAKING GEOPHYSICAL EXPLORATIONS
Filed March 11, 1940   25 Sheets-Sheet 5

INVENTORS
Lawrence F. Athy
Elton V. McCollum
BY
ATTORNEY

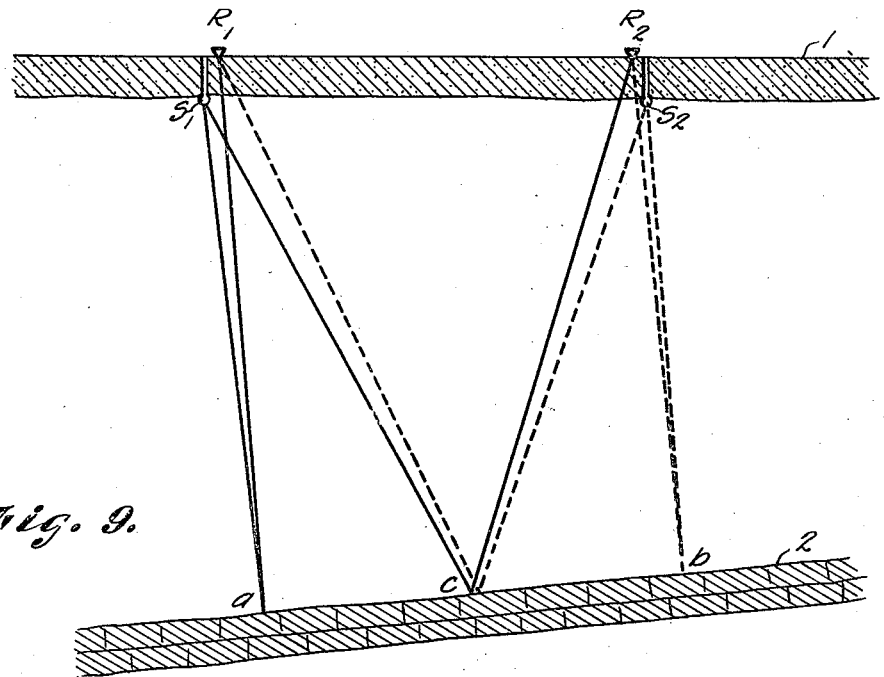
Fig. 9.
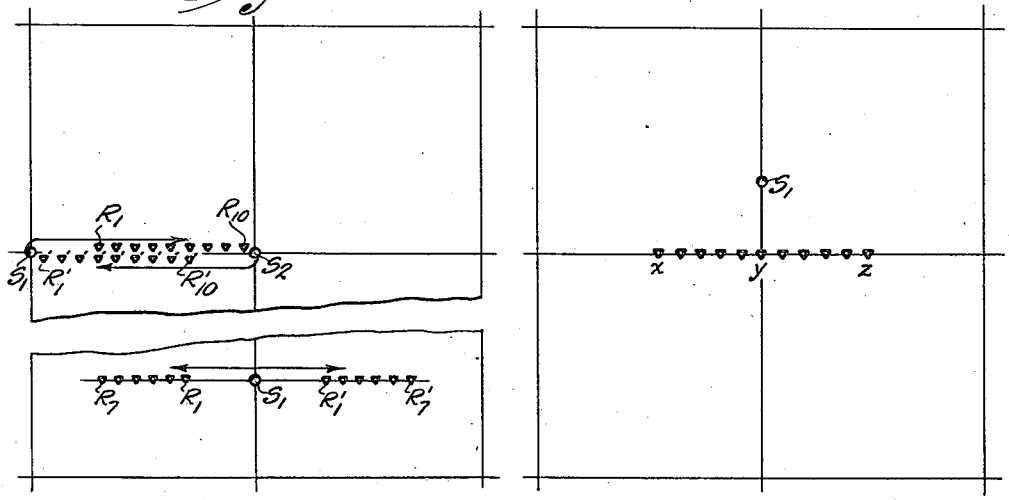
Fig. 10.
Fig. 10a.
Fig. 11.

Dec. 7, 1943.  L. F. ATHY ET AL  2,336,053
METHOD OF MAKING GEOPHYSICAL EXPLORATIONS
Filed March 11, 1940  25 Sheets-Sheet 7

INVENTORS
Lawrence F. Athy
Elton V. McCollum
BY
ATTORNEY

Dec. 7, 1943.  L. F. ATHY ET AL  2,336,053
METHOD OF MAKING GEOPHYSICAL EXPLORATIONS
Filed March 11, 1940  25 Sheets-Sheet 8

INVENTORS
Lawrence F. Athy
Elton V. McCollum
BY
ATTORNEY

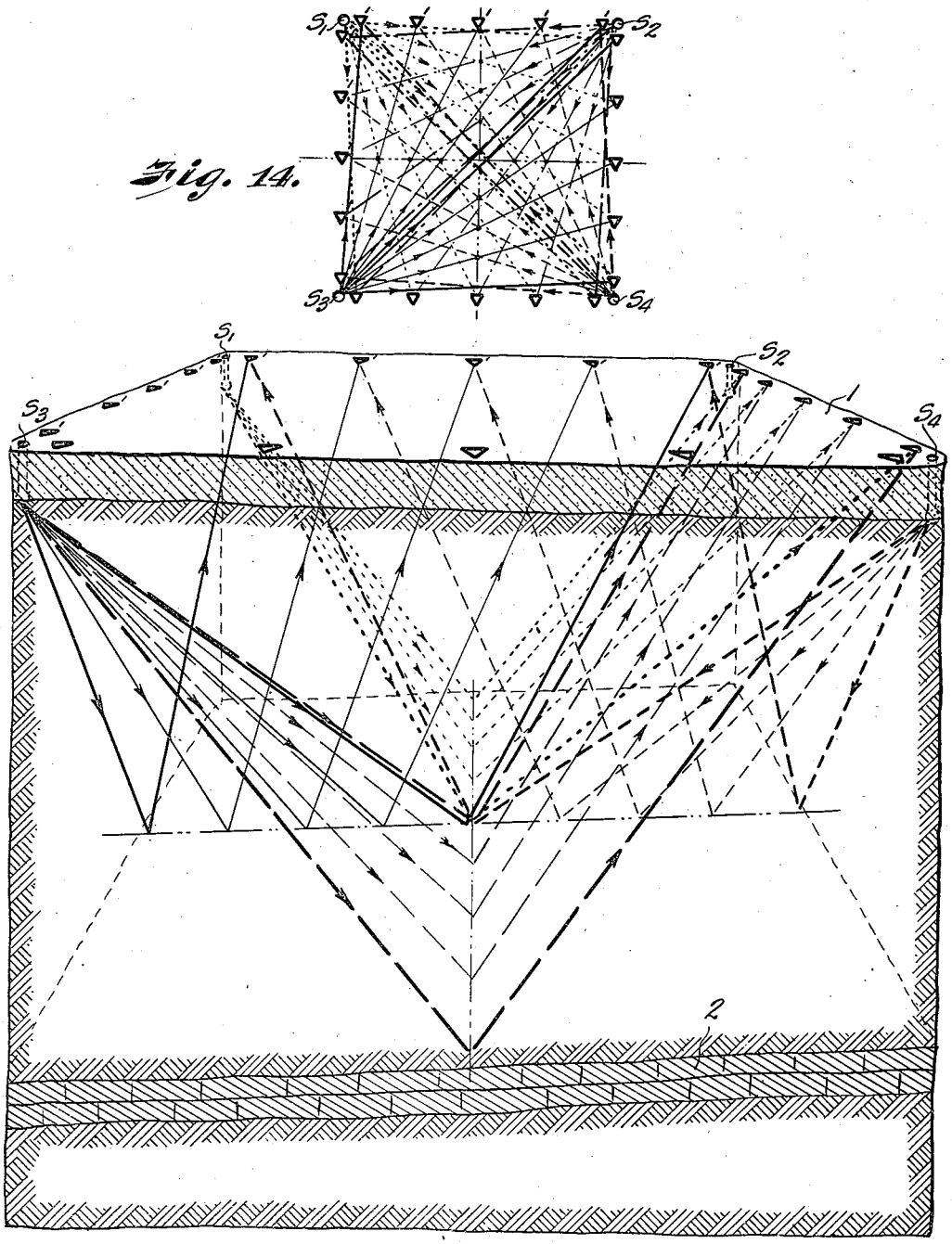

Dec. 7, 1943.   L. F. ATHY ET AL   2,336,053
METHOD OF MAKING GEOPHYSICAL EXPLORATIONS
Filed March 11, 1940   25 Sheets-Sheet 10

INVENTORS
Lawrence F. Athy
Elton V. McCollum
BY
ATTORNEY

Dec. 7, 1943.  L. F. ATHY ET AL  2,336,053
METHOD OF MAKING GEOPHYSICAL EXPLORATIONS
Filed March 11, 1940   25 Sheets-Sheet 12

INVENTORS
Lawrence F. Athy
Elton V. McCollum
BY
ATTORNEY

Dec. 7, 1943.　　　　L. F. ATHY ET AL　　　　2,336,053
METHOD OF MAKING GEOPHYSICAL EXPLORATIONS
Filed March 11, 1940　　25 Sheets-Sheet 13

INVENTORS
Lawrence F. Athy
Elton V. McCollum
BY
ATTORNEY

Dec. 7, 1943. L. F. ATHY ET AL 2,336,053
METHOD OF MAKING GEOPHYSICAL EXPLORATIONS
Filed March 11, 1940 25 Sheets-Sheet 14

INVENTORS
Lawrence F. Athy
Elton V. McCollum
BY
ATTORNEY

Dec. 7, 1943.  L. F. ATHY ET AL  2,336,053
METHOD OF MAKING GEOPHYSICAL EXPLORATIONS
Filed March 11, 1940  25 Sheets-Sheet 16

INVENTORS
Lawrence F. Athy
Elton V. McCollum
BY
ATTORNEY

Dec. 7, 1943.                L. F. ATHY ET AL                2,336,053
                METHOD OF MAKING GEOPHYSICAL EXPLORATIONS
                    Filed March 11, 1940        25 Sheets-Sheet 17

INVENTORS
Lawrence F. Athy
Elton V. McCollum
BY
ATTORNEY

Fig. 26,a.

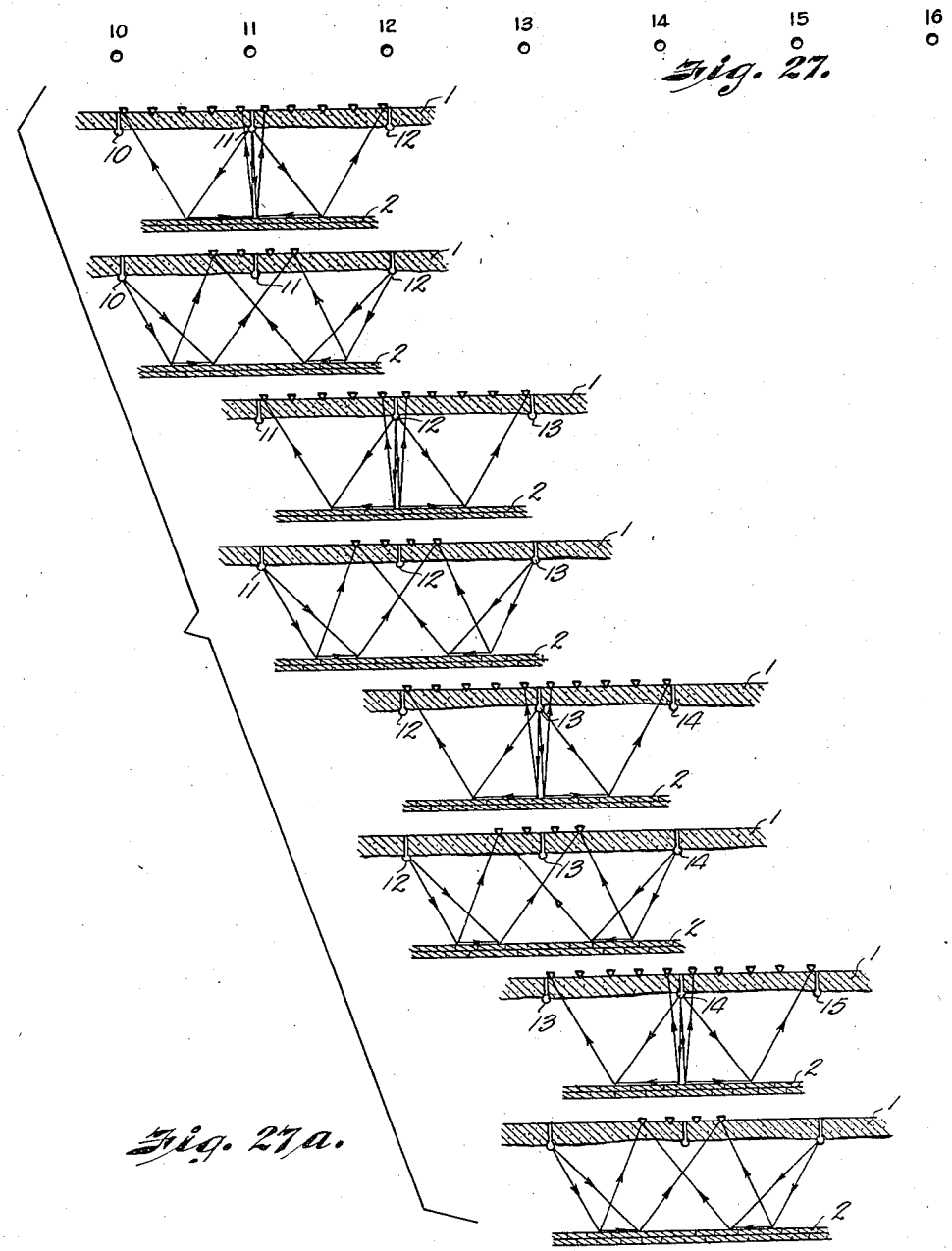

Dec. 7, 1943.  L. F. ATHY ET AL  2,336,053
METHOD OF MAKING GEOPHYSICAL EXPLORATIONS
Filed March 11, 1940  25 Sheets-Sheet 20

INVENTORS
Lawrence F. Athy
Elton V. McCollum
BY
ATTORNEY

Dec. 7, 1943.    L. F. ATHY ET AL    2,336,053
METHOD OF MAKING GEOPHYSICAL EXPLORATIONS
Filed March 11, 1940    25 Sheets-Sheet 21

Dec. 7, 1943.  L. F. ATHY ET AL  2,336,053
METHOD OF MAKING GEOPHYSICAL EXPLORATIONS
Filed March 11, 1940  25 Sheets-Sheet 22

INVENTORS
Lawrence F. Athy
Elton V. McCollum
BY
ATTORNEY

Dec. 7, 1943.  L. F. ATHY ET AL  2,336,053
METHOD OF MAKING GEOPHYSICAL EXPLORATIONS
Filed March 11, 1940  25 Sheets-Sheet 23

INVENTORS
Lawrence F. Athy
Elton V. McCollum
BY
ATTORNEY

Dec. 7, 1943.  L. F. ATHY ET AL  2,336,053
METHOD OF MAKING GEOPHYSICAL EXPLORATIONS
Filed March 11, 1940  25 Sheets-Sheet 24

INVENTORS
Lawrence F. Athy
Elton V. McCollum
BY
ATTORNEY

Dec. 7, 1943.   L. F. ATHY ET AL   2,336,053
METHOD OF MAKING GEOPHYSICAL EXPLORATIONS
Filed March 11, 1940   25 Sheets—Sheet 25

INVENTORS
Lawrence F. Athy
Elton V. McCollum
BY
ATTORNEY

Patented Dec. 7, 1943

2,336,053

UNITED STATES PATENT OFFICE 2,336,053

METHOD OF MAKING GEOPHYSICAL EXPLORATIONS

Lawrence F. Athy, Ponca City, Okla., and Elton V. McCollum, Houston, Tex., assignors to Continental Oil Company, Ponca City, Okla., a corporation of Delaware Application March 11, 1940, Serial No. 323,378

41 Claims. (Cl. 181—0.5)

Our invention relates to a method of making geophysical explorations.

This application is a continuation in part of copending application of Lawrence F. Athy et al., for "Seismic surveying," Serial No. 245,653, filed December 14, 1938.

It has been common practice in reflection seismograph exploration to use a velocity determined by making observations of the rate of travel of seismic waves in the walls of deep test holes drilled in the area being explored and performing the necessary calculations to obtain a desired depth or dip. In areas where such data of the velocity of seismic waves obtained from deep wells is not evolved, an estimated normal velocity is employed. It is impossible, by the methods of the prior art, to recognize the actual velocity applicable at a particular spot. It will be appreciated that velocity varies from place to place along relatively short distances. We propose to provide means to obtain the actual velocity in the field at a particular locality where such velocity information is needed.

In the reflection methods of the prior art, employing seismic waves, the operations were confined to isolated correlation determinations and scattered observations for obtaining dip of buried tectonic strata. In the co-pending application of Athy et al., Serial No. 245,653, a method of seismic reflection surveying is disclosed by which continuous profiling of the subsurface tectonic strata is achieved. The method of Athy et al. permits data to be obtained with respect to the substrata at regular small intervals in such manner as to give continuous coverage. This method has materially extended the usefulness of seismograph explorations. It, however, leaves much to be desired in places where the subsurface contour, size, attitude, and configuration are desired in great detail.

It is possible to employ the method of Athy et al. without obtaining the accurate information desired, because the particular velocity of the seismic wave travel in the specific locality being surveyed is not actually known but, on the other hand, an assumed velocity is employed. Accurate, detailed, and comprehensive results can be obtained only by employing the actual velocity in the particular locality in making the survey of that locality.

One object of our invention is to provide a novel method of geophysical exploration in which small changes in velocity may be predicted with considerable precision, even though the determination of the exact total magnitude of the velocity of travel of seismic waves in a particular locality may seem in error.

Another object of our invention is to provide a method of seismic surveying with the source of seismic waves and the seismic receivers so spaced as to enable the determination of the actual average velocity of travel of the seismic waves from the seismic wave source to the reflection medium in the particular locality being surveyed.

Another object of our invention is to provide a method of continuous profiling of subsurface layers which will yield greater subsurface detail and accuracy than has been heretofore possible.

Another object of our invention is to provide a method of seismic surveying in which, by a multiple coverage mode of shooting, we are enabled to obtain a continuous chain of correlatable reflection points along and on the reflecting horizon, in which errors due to wave interference and near surface conditions are minimized by averaging.

Another object of our invention is to provide a method of seismic surveying in which the average local velocity of the travel of seismic waves and the dip, datum, and divergence of the subsurface strata may be determined simultaneously.

Another object of our invention is to provide a method in which substantially accurate predictions of the velocity of seismic waves in conjunction with accurate determinations of travel times to reflecting horizons from which accurate determinations of dip, datum and divergence may be made, may be achieved.

Another object of our invention is to provide a method of seismic surveying in which determinations of velocities, and more particularly determinations of velocity variations to the exact horizons on which the travel times are obtained, may be made.

Another object of our invention is to provide a more complete and more accurate method of reflection seismic surveying.

Other and further objects of our invention will appear from the following description.

In the accompanying drawings which form part of the instant specification and which are to be read in conjunction therewith, and in which like reference numerals are used to indicate like parts in the various views:

Figure 9 is a diagrammatic view showing another mode of carrying out our invention in areas where the reflections are of distinctive character, whereby the velocity of the reflected seismic waves may be ascertained.

Figure 10 is a plan view showing shot point and receiver disposition in still another mode of carrying out our invention for determining the velocity of reflected seismic waves.

Figure 10a is a plan view showing the shot point receiver disposition in a further modification of the method of our invention for determining the velocity of reflected seismic waves.

Figure 11 is a plan view showing shot point and receiver dispositions in another form of practicing the method of our invention for determining the velocity of reflected seismic waves.

Figure 14 is a further and different arrangement of shot point and receivers capable of carrying out the method of our invention for determining the velocity of reflected seismic waves.

Figure 14a is a diagrammatic perspective view showing the path of travel of seismic waves in carrying out the method of our invention, shown in Figure 14.

Figure 25 is a plan view of a line of shot holes.

Figure 26a is a plurality of sectional elevations taken along the line of shot holes shown in Figure 26, illustrating still another multiple coverage method of shooting for dip, datum, and divergence, which provides the proper travel time-distance data for more than one determination of dip, datum, and divergence over a linear reflected segment.

Figure 27 is a plan view of a line of shot holes.

Figure 27a is a plurality of sectional elevations taken along the line of shot holes shown in Figure 27 and illustrating a still further embodiment of our invention of a multiple coverage method of shooting for dip, datum, and divergence, which provides the proper travel time-distance data for more than one determination of dip, datum, and divergence over a linear reflected segment.

Figure 28 is a diagrammatic view showing the linear reflected segments obtained by one step of the method shown in Figure 25a.

Figure 28a is a diagrammatic view showing the linear reflected segments obtained by another step of the method shown in Figure 25a.

Figure 28b is a diagrammatic view showing the multiple continuous substrata coverage obtained by using the method shown in Figure 25a.

Figure 29 is a diagrammatic view showing the continuous coverage obtained by one step of the method shown in Figure 26a.

Figure 29a is a diagrammatic view showing the partial coverage obtained by the second step of the method shown in 26a.

Figure 29b is a diagrammatic view showing the continuous coverage and double partial coverage obtained by using the complete method shown in Figure 26a.

Figures 35, 35A:
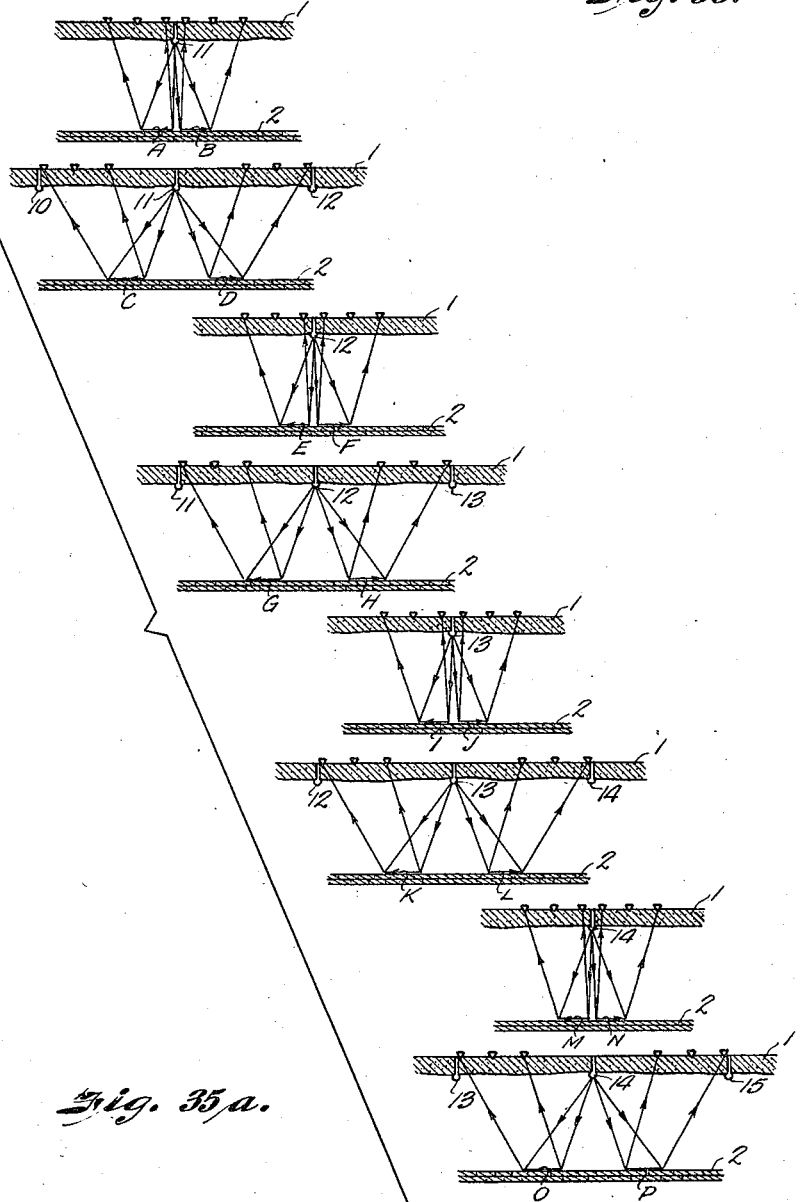
Figure 35 is a plan view of a line of shot holes.

Figure 35a is a plurality of diagrammatic sectional elevations taken along the line of shot holes shown in Figure 35, disclosing a method of making geophysical explorations by seismic surveying for simultaneous determination of velocity, dip, datum, and divergence, which method of our invention provides the proper travel time-distance data for the simultaneous determination of velocity as well as dip, datum, and divergence over a linear reflected segment.

Figure 36:
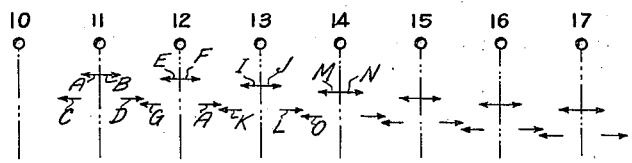

Figure 36 is a diagrammatic view showing one method of combining records obtained by the method of shooting in Figure 35a from which velocity determinations may be made.

Figure 36A:
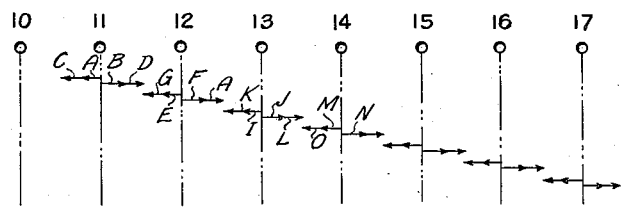

Figure 36a is a diagrammatic view similar to Figure 36 showing another method of combining records obtained by shooting according to Figure 35a from which combination of records and method of shooting, velocity determinations may be made.

Figure 37:
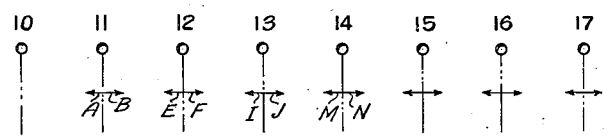

Figure 37 is a diagrammatic view of a line of shot holes showing segments on the reflecting stratum along which seismic waves are reflected in carrying out one step of the method shown in Figure 35a from which reflections dip, datum, and divergence may be obtained.

Figure 37A:
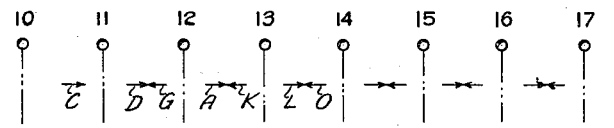

Figure 37a is a view similar to Figure 37, showing the reflecting segments of the other step of the process shown in Figure 35a from which dip, datum, and divergence may be obtained.

Figure 37B:
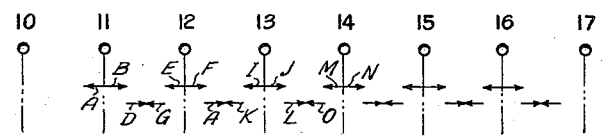

Figure 37b is a view similar to Figure 37 showing the combined reflecting segments from both steps of the method shown in Figure 35a, giving continuous coverage.

In reflection seismic surveying, explorations are made by generating seismic waves by the detonation of a charge of explosives, usually placed in a shot hole drilled from fifty to a few hundred feet deep through the surface zone of variable weathering. Receiving equipment in the form of seismometers are deployed on the earth's surface in a planned arrangement with respect to the shot point source of energy. Seismic waves reflected from various subsurface strata are received by the seismometers and converted into electrical energy in response to the seismic waves. This electrical energy is amplified and recorded by means well known to the art.

In the instant method, by the proper use and disposition of these means, we procure reflection records from which dependable and usable velocities of reflection waves may be determined. We provide further a multiple coverage method of shooting for dip, datum, and divergence, which provides the proper travel time-distance data for more than one determination of dip, datum, and divergence over a linear reflected segment, to obtain unexpected results hereinafter more fully described. Further, we provide a method of making geophysical explorations by means of seismic reflection shooting for the simultaneous determination of velocity, dip, datum, and divergence which provides the proper travel time-distance data for the determination of the velocity of travel of the seismic waves as well as dip, datum, and divergence over a linear reflected segment.

In seismograph exploration, it is recognized that the rate of propagation of reflected seismic energy varies from place to place because of differences in the character of the underground strata through which the reflected energy travels. An approximation of velocities may be determined by observation of travel time from two or more paths to a given reflecting horizon. Such a method is illustrated in Figure 1.

Figure 1:
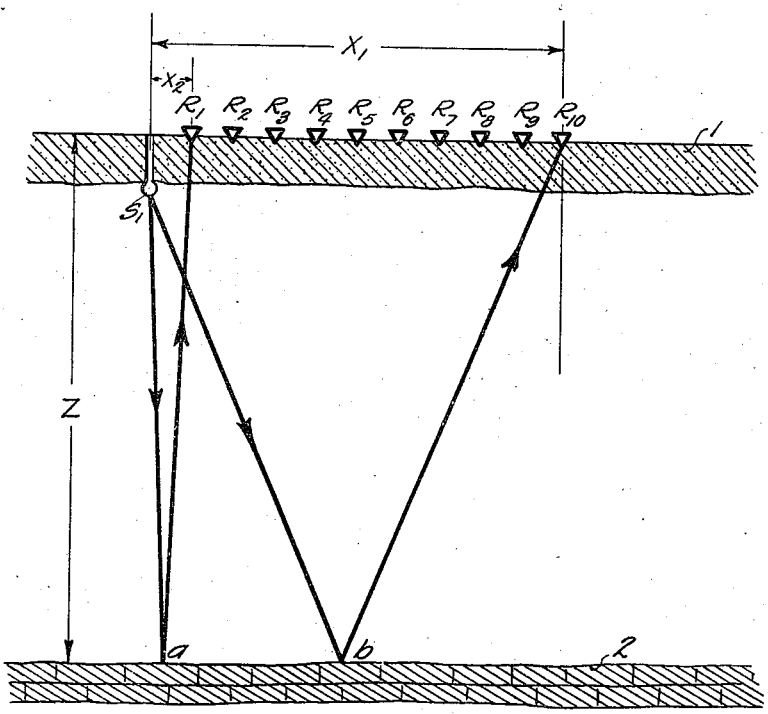
Figure 1 is a diagrammatic view showing a method of making velocity determinations by means of reflection profiles.

Referring now to Figure 1, there is shown a spread of seismophones $R_1$, $R_2$, $R_3$, $R_4$, $R_5$, $R_6$, $R_7$, $R_8$, $R_9$ and $R_{10}$ to a shot hole $S_1$ drilled below the weathered layer $I$. The reflecting horizon is indicated by the reference numeral $2$.

In Figure 1, the dimension Z is the depth from the surface to the reflecting horizon 2. Let V be the velocity of the travel of seismic waves. Let $T_1$ be the travel time of the seismic wave passing along the path $S_1$—$b$—$R_{10}$. The distance between the shot point $R_{10}$ and the seismometer $R_{10}$ on the surface is represented by $X_1$. Let $T_2$ be the travel time of the seismic wave along the path $S_1$—$a$—$R_1$. Let $X_2$ be the lateral distance on the earth's surface between the shot point $S_1$ and the seismophone $R_1$. Then:

(1) $$Z^2 = \left(\frac{VT_1}{2}\right)^2 - \left(\frac{X_1}{2}\right)^2$$

and (2) $$Z^2 = \left(\frac{VT_2}{2}\right)^2 - \left(\frac{X_2}{2}\right)^2$$

Subtracting these two equations, we have:

(3) $$V^2 = \frac{X_1^2 - X_2^2}{T_1^2 - T_2^2}$$

and (4) $$V = \sqrt{\frac{X_1^2 - X_2^2}{T_1^2 - T_2^2}}$$

It is clear from this equation that the relation between $$(X_1^2 - X_2^2) \text{ and } (T_1^2 - T_2^2)$$

is linear and that greater differences between $X_1$ and $X_2$, in other words longer effective seismometer spreads, means larger increments of travel time from which to compute V, that is, greater accuracy in the value of V. In our method we therefore strive to make $$X_1^2 - X_2^2$$

as large as possible and still accurately record correlatable reflections.

The above method is not accurate because the dip of the reflecting bed is unknown and there is no assurance whatever that the depth from the surface to reflecting point $a$ is the same as that from the surface to reflecting point $b$. Obviously, if the dip varies the time paths must vary, not only because of the dip but because of velocity. Furthermore, if seismometer $R_{10}$ is not at the same elevation as seismometer $R_1$ or if the reflecting bed is not parallel to a line through the seismometers then the relative length of the paths is not properly assumed and the velocity obtained from the shot is incorrect.

Figure 2:
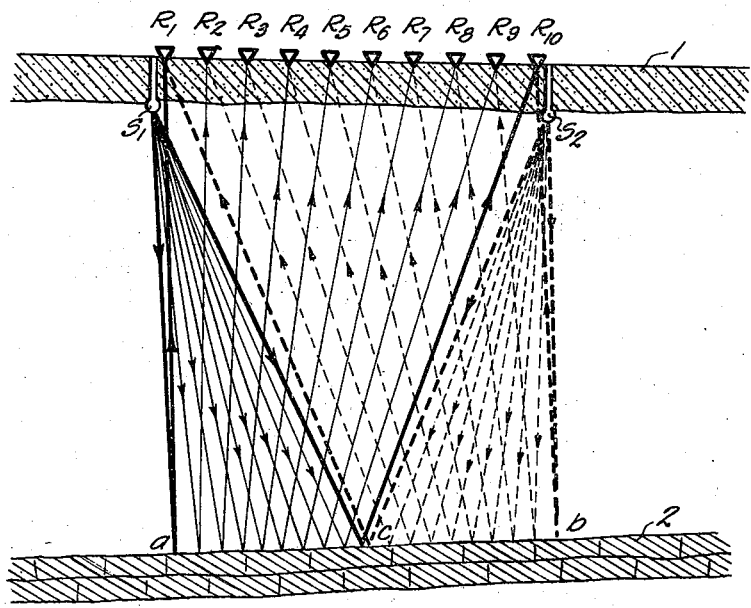
Figure 2 is a diagrammatic view showing the location of shot points and receivers in the practice of a method of reflection seismic surveying of our invention, for the determination of velocities.

A method of making velocity determinations by means of reflection profiles according to our invention is shown in Figure 2. In our method of determining velocities, the error introduced by the variable and unknown dip in a reflecting bed is eliminated. In our method, errors due to surface weathering conditions and variable topography are avoided. In our method, we employ long distances between shot point and the end seismophones of the spread, thereby providing large differences in the length of critical reflection paths. This enables us to make accurate velocity determinations and obtain a plurality of paths with attendant times, which may be averaged to secure accuracy.

Referring now to Figure 2, we have shown a shot hole $S_1$ and a shot hole $S_2$, drilled through the weathered layer 1. Between the shot holes we provide a spread of seismometers $R_1$, $R_2$, $R_3$, $R_4$, $R_5$, $R_6$, $R_7$, $R_8$, $R_9$, and $R_{10}$. The distance between the two shot holes is at least 3,000 feet. In practicing our method, the largest practicable distance is selected at which reflections may be readily recorded and identified. Normally, this distance is about equal to the depth of the reflecting horizon being investigated. It should be noted, in normal reflection seismic surveying in which dip or depth of the reflecting horizon is to be determined, that the distance between the shot point and the most remote seismometer is rarely over a few hundred feet and never, in general practice, exceeds 3,000 feet. It will be readily appreciated that the spread in making velocity determinations, is therefore much greater in length than that normally employed in shooting for dip or depth. Short spreads are always used in correlation or depth shooting in order to preserve record character. In dip shooting, spreads are not over 3,000 feet long and are usually between 1,000 feet and 2,000 feet, because the changes in direction of dip often occur at short intervals so that the use of longer spreads would fail to disclose steep or short extensions of dip. In Figure 2, the seismometers are evenly spaced between the shot holes and the various paths of seismic waves from shot hole $S_1$ to the seismometers are shown in full lines. The extreme seismic wave paths recorded in each of the shots from $S_1$ and $S_2$ are shown in heavier lines than the remaining paths. It will be clear, by reference to Figure 2, that the record of the shot taken from $S_1$ will be reflected from the horizon 2 along the line from $a$ to $c$. It will be further clear, by reference to Figure 2, that the seismic waves from a shot at shot point $S_2$ will be reflected along the line from $b$ to $c$ so that the combined records made by the two shots along the spread $R_1$ to $R_{10}$ will give reflections extending between $a$ and $b$ along the reflecting horizons. Since the dip of the stratum 2 is unknown, if the shot from $S_1$ is recorded in an up-dip position and the shot from $S_2$ is recorded in a symmetrically down-dip position, the average perpendicular to reflecting bed at point $c$ is the average of those at $a$ and at $b$. From the foregoing, it will be clear to those skilled in the art that the average of the travel time of a seismic wave along path $S_1$—$a$—$R_1$ and the travel time of a seismic wave along the path $S_2$—$b$—$R_{10}$ may be taken as $T_2$. Similarly, the average of the travel times along paths $S_1$—$c$—$R_{10}$ and $S_2$—$c$—$R_1$ may be taken as $T_1$, it being understood that the values $T_2$ and $T_1$ are used in solving for V, the velocity to be determined. In a similar manner, any two symmetrical paths may be averaged for $T_1$. For example, the average of a path from $S_1$ to $R_9$ may be made with the travel time from $S_2$ to $R_2$. Furthermore, the travel time of the direct wave from $S_1$ to $R_1$ and the travel time from $S_2$ to $R_{10}$ may be noted and used in correcting the travel times of the reflected wave to eliminate the factors of variable surface, weathering and topography.

Figure 3:
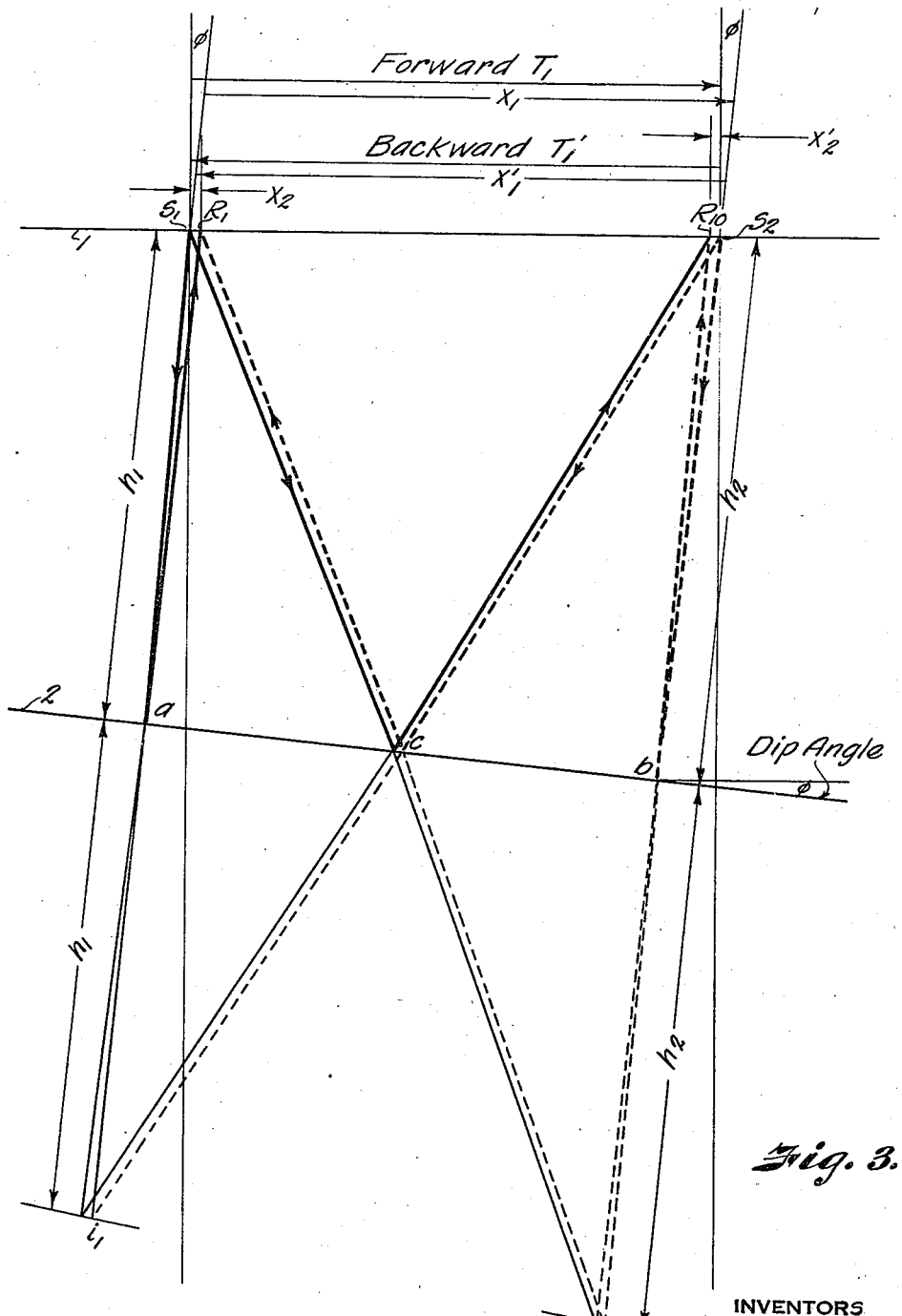
Figure 3 is a diagrammatic view showing one method embodying our invention for determining velocities by means of reflection profiles demonstrating, by mathematics, the accuracy of our method.

Referring now to Figure 3, we have shown a diagrammatic view of the arrangement shown in Figure 2, with the dip of the reflected bed reversed. Reference numerals similar to Figure 2 are used in Figure 3, the line 1 representing one median through the weathered layer and the line 2 representing the reflecting bed. The heavy full lines above the reflecting bed indicate the true paths of the seismic wave travel from shot point $S_1$ to seismophones $R_1$ and $R_{10}$ respectively. The heavy dotted lines indicate the true paths of the seismic waves from shot point $S_2$ to seismophones $R_{10}$ and $R_1$, respectively. The distance between the shot point $S_1$ and the reflection point $a$ is represented by $h_1$. The perpendicular distance from shot point $S_2$ to reflecting point $b$ is represented by $h_2$. The imaginary paths or images of the paths of the seismic waves are shown in light lines below the reflecting horizon 2.

$i_1$ is the image of elastic waves originating at $S_1$. $i_2$ is the image of elastic waves originating at $S_2$.

By the laws of light applicable to mirrors, which is analogous to the situation in the instant case, that is the angle of incidence equals the angle of reflection, path $S_1$—$c$—$R_{10}$ is equivalent to path $i_1$—$c$—$R_{10}$.

Applying the theorem of cosines to the triangle $S_1$—$i_1$—$R_{10}$ and letting $\phi$ represent the dip angle:

(1) $(i_1-c-R_{10})^2 = 4h_1^2 + X_1^2 - 4h_1 X_1 \cos(90+\phi)$
$= 4h_1^2 + X_1^2 + 4h_1 X_1 \sin \phi$ (2) $V^2 T_1^2 = 4h_1^2 + X_1^2 + 4h_1 X_1 \sin \phi$
(Forward direction to recorder 10)

also (3) $V^2 T_2^2 = 4h_1^2 + X_2^2 + 4h_1 X_2 \sin \phi$
(Forward direction to recorder $R_1$)

then (4) $V^2 (T_1^2 - T_2^2) = X_1^2 - X_2^2 + 4h_1 \sin \phi (X_1 - X_2)$
(Forward direction)

also (5) $(i_2-c-R_1)^2 = 4h_2^2 + X_1'^2 - 4h_2 X_1' \cos(90-\phi)$
$= 4h_2^2 + X_1'^2 - 4h_2 X_1' \sin \phi$ (6) $V^2 T_1'^2 = 4h_2^2 + X_1'^2 - 4h_2 X_1' \sin \phi$
(Backward direction to recorder $R_1$)

also (7) $V^2 T_2'^2 = 4h_2^2 + X_2'^2 - 4h_2 X_2' \sin \phi$
(Backward direction to recorder $R_{10}$)

then (8) $V^2 (T_1'^2 - T_2'^2) = X_1'^2 - X_2'^2 - 4h_2 \sin \phi (X_1' - X_2')$
(Backward direction)

also (9) $V^2 [(T_1^2 - T_2^2) + (T_1'^2 - T_2'^2)] = X_1^2 + X_1'^2 - X_2^2 - X_2'^2 + 4h_1 \sin \phi (X_1 - X_2) - 4h_2 \sin \phi (X_1' - X_2')$ When $\phi$ is not great, and when $X_1 - X_2$ is the same order of magnitude as $X_1' - X_2'$, $4h_1 \sin \phi (X_1 - X_2) - 4h_2 \sin \phi (X_1' - X_2')$ is quite small and negligible compared to the other terms. That is:

(10) $V^2 = \dfrac{X_1^2 + X_1'^2 - X_2^2 - X_2'^2}{(T_1^2 - T_2^2) + (T_1'^2 - T_2'^2)}$
(Independent of dip $\phi$)

When $X_1' = X_1$ and $X_2' = X_2$, $T_1 = T_1'$

(11) $V^2 = \dfrac{2X_1^2 - 2X_2^2}{(T_1^2 - T_2^2) + (T_1^2 - T_2'^2)}$

Now:

$T_1^2 - T_2^2 = (T_1 + T_2)(T_1 - T_2) = (T_1 + T_2) \Delta T_{Forward}$
$T_1^2 - T_2'^2 = (T_1 + T_2')(T_1 - T_2') = (T_1 + T_2')(\Delta T_{Backward})$ so that:

$V^2 = \dfrac{2X_1^2 - 2X_2^2}{(T_1 + T_2)\Delta T_{Forward} + (T_1 + T_2')\Delta T_{Backward}} =$ $\dfrac{2X_1^2 - 2X_2^2}{(\Delta T_{Forward} + \Delta T_{Backward}) 2 T_{average}} =$ $\dfrac{X_1^2 - X_2^2}{(\Delta T_{Forward} + \Delta T_{Backward}) T_{average}}$ Referring again to Figure 2, the spread between $S_1$ and $S_2$ may be covered by a series of shots. The full complement of seismometers available may be spread over a fraction of the distance, as for example between $R_1$ and $R_4$ of Figure 2, and a shot recorded from shot point $S_1$. Then, the seismometers may be distributed from positions $R_4$ to $R_7$ and a second shot recorded from shot point $S_1$. Finally, the basement from $a$ to $c$ may be completed by seismometers from $R_7$ to $R_{10}$ and a third shot recorded from shot point $S_1$. To cover the basement from $c$ to $b$, seismometers may be spread from positions $R_{10}$ to $R_7$ and a shot recorded from shot point $S_2$. Then the seismometers may be spread between positions $R_7$ and $R_4$ and a second shot recorded from shot point $S_2$ and finally, the seismometers may be spread from $R_4$ to $R_1$ and a third shot recorded from shot point $S_2$ thus completing the distance between $c$ and $b$ on the reflecting bed 2. The series of shots just described will effectively cover the basement from $a$ to $b$ in a manner equivalent to firing a single shot from shot point $S_1$ with the seismometers spread between $S_1$ and $S_2$ and then firing a second shot from shot point $S_2$ with the seismometers spread from $R_{10}$ to $R_1$.

Likewise, our method may be practiced with the shot holes $S_1$ and $S_2$ spaced along a line offset but parallel to the seismometer spread.

Figure 4:
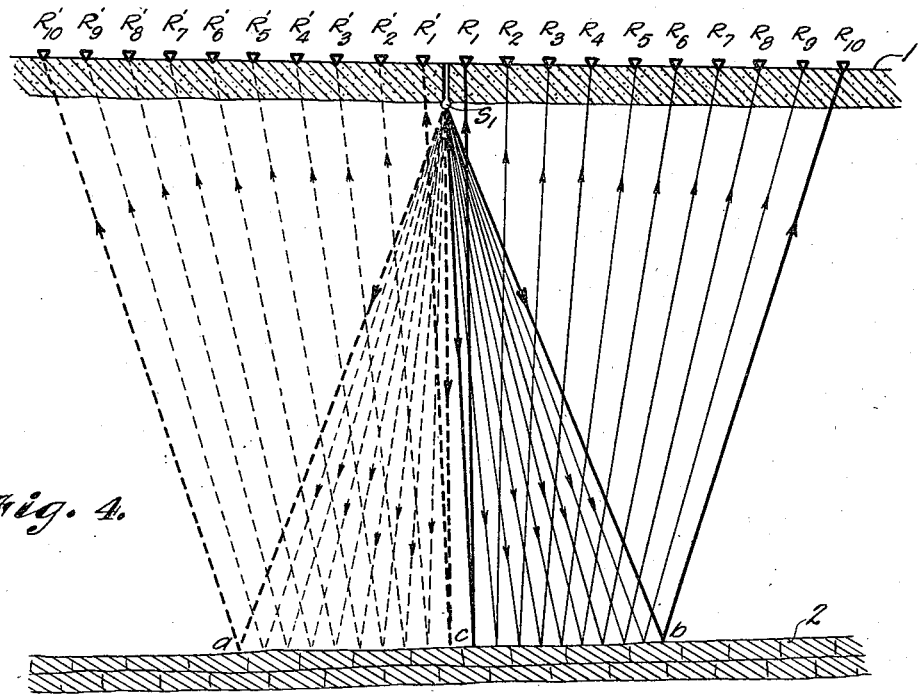
Figure 4 is another form of practicing the method of our invention for the determination of velocities.

Referring now to Figure 4, we disclose another embodiment of our method. With the seismometers spread between points $R_1$ and $R_{10}$, a shot is recorded from shot point $S_1$. Then another shot is fired from $S_1$ with the seismometers spread from $R_1'$ to $R_{10}'$. The average travel times over the path $S_1$—$a$—$R_{10}'$ and $S_1$—$b$—$R_{10}$ is used as $T_1$ and the path $S_1$—$c$—$R_1$ or the path $S_1$—$c$—$R_1'$ is used as $T_2$. The effect of dip and surface variables is eliminated or corrected in the same manner as in Figure 2. The distances $S_1$—$R_{10}$ and $S_1$—$R_{10}'$ are normally equal. These distances need not be equal but should be greater than 3,000 feet. It will be noted that this spread of at least 3,000 feet is necessary in carrying out our method for velocity determination and distinguishes it from normal reflection shooting for dip or depth. As pointed out above, the total spread from $R_{10}$ to $R_{10}'$ may be covered by a series of shots using a plurality of shorter instrument spreads in which there is a common seismometer in successive spreads so that the spreads may be correlated without difficulty. Recording a shot from shot point $S_1$ with a full complement of seismometers spread from $R_1$ to $R_{10}$ and then repeating the operation with the spread from $R_1'$ to $R_{10}'$ is particularly effective. It is to be understood, of course, that the spread of seismometers from $R_{10}'$ to $R_{10}$, which would be at least 6,000 feet, may be made and a single shot recorded from shot point $S_1$.

The method shown in Figure 4 may likewise be carried out with the shot point directly in line with the seismometer spread or offset a selected distance to escape the bad effects of shot point noise and disturbance as pointed out in copending application of Athy et al., above referred to.

Figure 5:
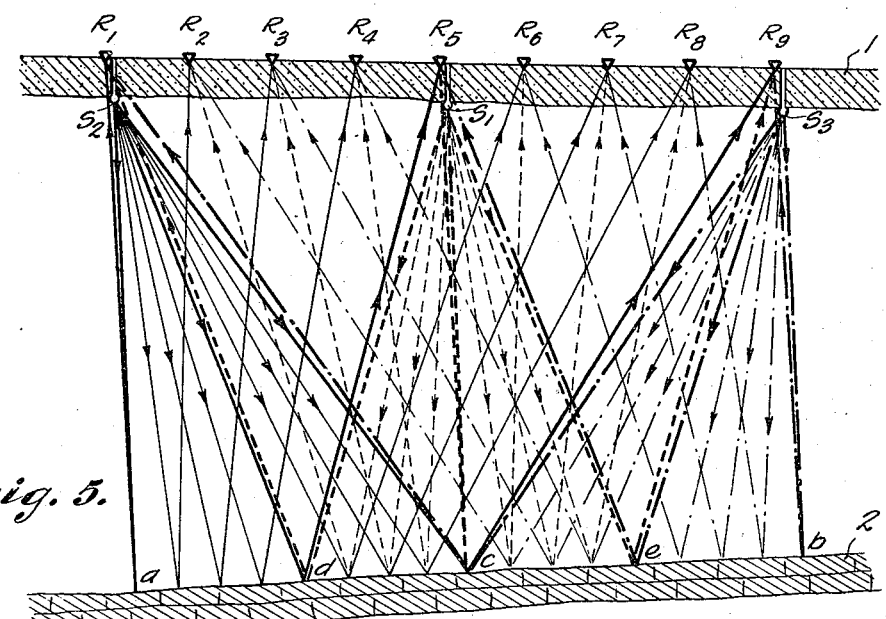
Figure 5 is a diagrammatic view showing another mode of determining velocities in accordance with our invention.

Another embodiment of our invention is shown in Figure 5. In this embodiment the shot point $S_1$ is midway between shot points $S_2$ and $S_3$. The distance from $S_2$ to $S_3$ is in excess of 3,000 feet. A record is taken from shot point $S_2$ with the seismometer spread between shot points $S_2$ and $S_3$. A shot is then recorded with the same seismometers from shot point $S_3$. This procedure, it will be observed, is thus far that disclosed in the embodiment of the invention shown in Figure 2 and time paths $S_2$—$a$—$R_1$ and $S_3$—$b$—$R_9$ may be averaged to obtain $T_2$. Additional time paths $S_2$—$c$—$R_9$, $S_3$—$c$—$R_1$, $S_2$—$d$—$R_5$, and $S_3$—$e$—$R_5$ are likewise obtained, which may be used. Records are also taken from $S_1$ with the seismometers spread from $R_1$ to $R_5$ and from $R_5$ to $R_9$ providing time paths $S_1$—$c$—$R_5$, $S_1$—$d$—$R_1$, and $S_1$—$e$—$R_9$. It will be clear that the records from $S_1$ and $S_2$ have substantially common paths to the reflecting point $d$ and that the records recorded from shot points $S_3$ and $S_1$ have substantially common paths to the reflecting point $e$. Accordingly, the records from shot points $S_1$, $S_2$, and $S_3$ can be readily correlated and reflections coming from identical beds can be identified on the several records. Still referring to Figure 5, it will be seen that paths $S_2$—$c$—$R_9$ and $S_3$—$c$—$R_1$, as well as $S_1$—$c$—$R_5$ have a substantially identical reflection point $c$. This enables us to correlate a time path $S_1$—$c$—$R_5$ on the records with time paths $S_2$—$c$—$R_9$ and $S_3$—$c$—$R_1$ and the corrected time path $S_1$—$c$—$R_5$ can be used with the average of time paths $S_2$—$c$—$R_9$ and $S_3$—$c$—$R_1$ in calculating the velocity of seismic waves reflected from point $c$.

By the embodiment of our method shown in Figure 5, the effect of dip may be eliminated and surface corrections for weathering and topography can be made readily by the use of direct waves from $S_2$ to $R_1$, $S_1$ to $R_5$, and $S_3$ to $R_9$.

Figure 6:
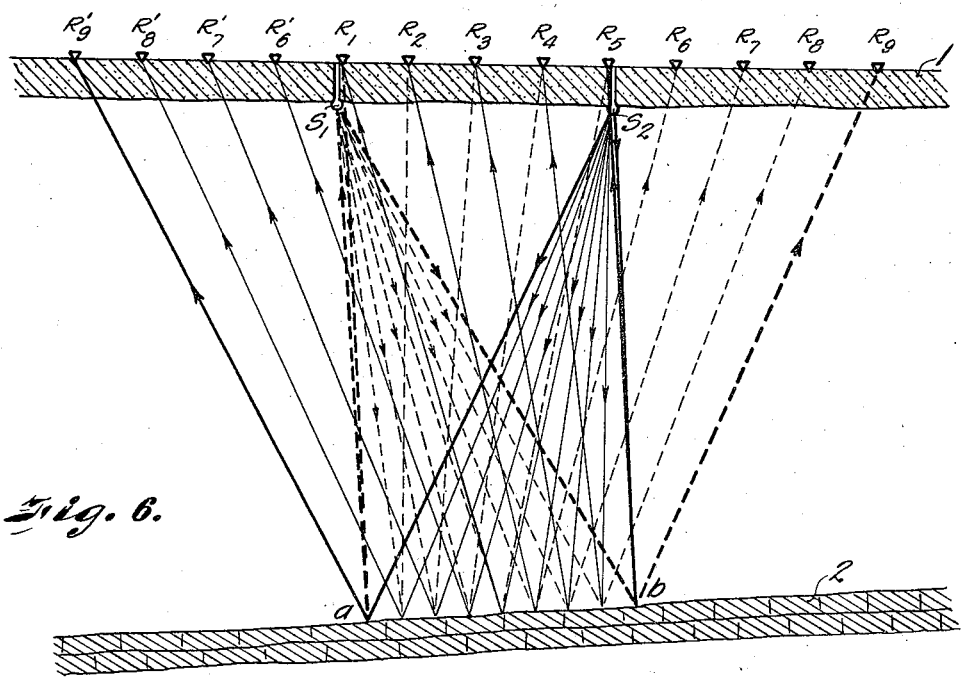
Figure 6 is a diagrammatic view of another mode of reflection profile seismic surveying for determining velocities in accordance with our invention.

Still another form of our method is shown in Figure 6. A line of seismometers $R_1$ to $R_9$ extends at least 3,000 feet from shot point $S_1$, it being understood that this line may be as much over 3,000 feet as the estimated limit at which reflections may be recorded. A record is made by recording at seismometers $R_1$, $R_2$, $R_3$, $R_4$, $R_5$, $R_6$, $R_7$, $R_8$, and $R_9$ from the shot point $S_1$, giving reflections along the basement on the reflecting bed 2 between points $a$ and $b$. Midway or approximately midway of the seismometer line, we place another shot point $S_2$ at approximately the position of seismometer $R_5$. Additional seismometers $R_6'$, $R_7'$, $R_8'$, and $R_9'$ are spread in the opposite direction of the first spread so that the spread of seismometers from $R_5$ to $R_9'$ is at least 3,000 feet and further, that the distance of the spread of seismometers from $R_9'$ to $R_1$ is equal to that from $R_1$ to $R_5$ and from $R_5$ to $R_9$. A shot is then made at shot point $S_2$ and records made at seismometers $R_5$, $R_4$, $R_3$, $R_2$, $R_1$, $R_6'$, $R_7'$, $R_8'$, and $R_9'$. This will give reflections from the stratum 2 between the identical points between $a$ and $b$ but in the reverse direction from the reflections made from shot hole $S_1$. This method is particularly effective if the dip of the reflecting bed is steep or if its surface is irregular. The time paths $S_2$—$b$—$R_5$ and $S_2$—$a$—$R_9'$, taken with $S_1$—$a$—$R_1$ and $S_1$—$b$—$R_9$, can be used to provide data for accurate velocity determinations. If desired, other intermediate paths may be employed as well, as pointed out hereinabove.

Figure 6A:
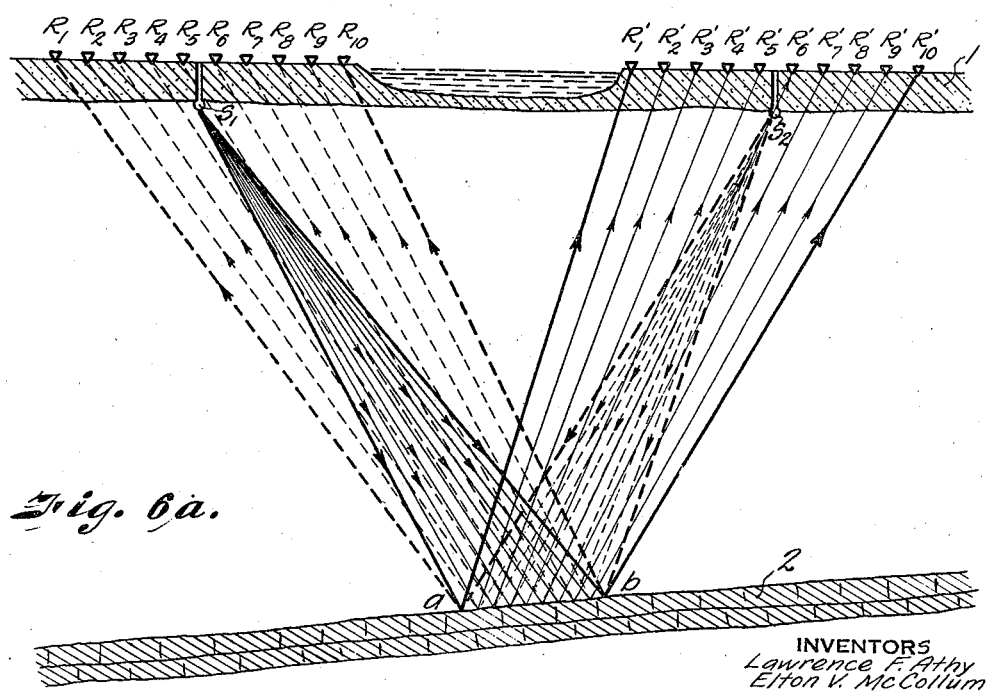
Figure 6a is a diagrammatic view of still another method of reflection seismic surveying for providing the proper travel time-distance data for determining the velocity of travel of seismic waves in a particular locality.

Referring now to Figure 6a, we have shown another embodiment of our invention, which may be used in event there is an intervening obstruction such as a body of water or the like, the basement of which on the reflecting layer it is desired to survey and to obtain velocity information with respect to reflections therefrom. It will be observed that Figure 6a enables us to obtain the same result as obtained by the method shown in Figure 6, namely reflections both up-dip and down-dip between two identical points on a basement. A line of seismometers is spread from $R_1$ to $R_{10}$ and a shot fired from shot point $S_2$. This will give reflections between points $a$ and $b$ on stratum 2 down-dip. A shot point $S_1$ is then located midway the seismometer spread and the seismometers are then moved to positions $R_1'$ to $R_{10}'$ inclusive, symmetrical with respect to shot point $S_2$. A shot is then fired from shot point $S_1$ which will give reflections between points $a$ and $b$ up-dip on stratum 2. The time travel paths $S_2$—$a$—$R_1$ and $S_1$—$b$—$R_{10}'$ may be averaged to obtain the value $T_1$ in making the velocity determinations. Similarly, the time travel paths $S_2$—$b$—$R_{10}$ and $S_1$—$a$—$R_1'$ may be averaged to obtain $T_2$.

Figure 7:
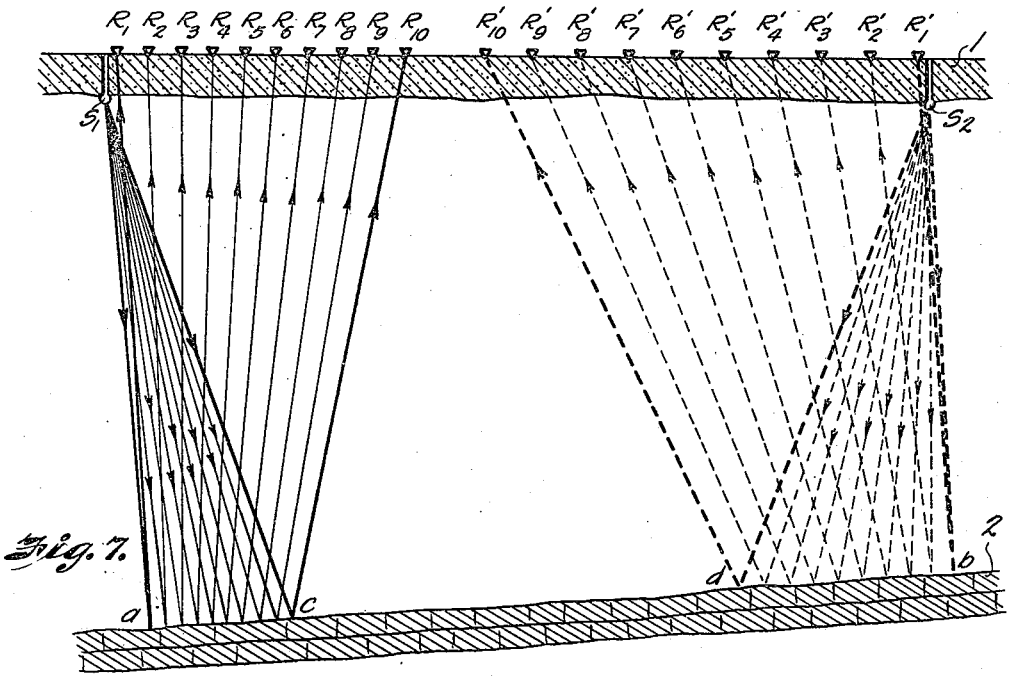
Figure 7 is a diagrammatic view showing a further embodiment of our invention with respect to obtaining the proper travel time-distance data for velocity determinations.

Another embodiment of our invention is shown in Figure 7, in which one record is taken shooting from shot point $S_1$ with the seismophones spread as shown from $R_1$ to $R_{10}$. A second record is taken from shot point $S_2$ with the recorders spread as shown from $R_1'$ to $R_{10}'$. It will be noted that the distance from $R_1$ to $R_{10}$ is not equal to the distance from $R_1'$ to $R_{10}'$ and it need not be, to obtain a reliable velocity determination, provided always that the reflecting bed 2 has a uniform mono-clinal dip. This will be apparent by reference to a mathematical demonstration of the theorem involved, given in connection with Figure 3. If the positions of $R_{10}$ and $R_{10}'$ are coincident, then our method is effective in eliminating differences in weathering or elevation, which may exist between $R_{10}$ and the shot points and this is a further feature of our invention. In this form of the invention, that is, the one shown in Figure 7, calculations may be made from Equation 10, where $X_1$=distance from shot point $S_1$ to $R_{10}$, $X_2$=distance from shot point $S_1$ to $R_1$, $X_1'$=distance from shot point $S_1$ to $R_{10}'$, $X_2'$=distance from shot point $S_2$ to $R_1'$, $T_1$=travel time along path $S_1$—$c$—$R_{10}$, $T_2$=travel time along path $S_1$—$a$—$R_1$, $T_1'$=travel time along path $S_2$—$d$—$R_{10}'$, and $T_2'$=travel time along path $S_2$—$b$—$R_1'$.

Figure 8:
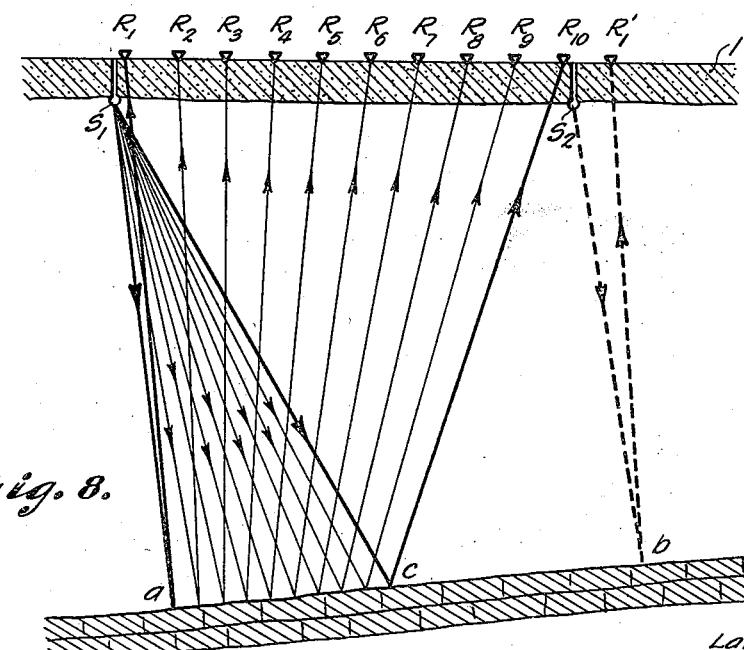
Figure 8 shows another form of shot point and receiver disposition for carrying out our method for obtaining the velocity of travel of reflected seismic waves.

Still another form in which our method may be carried out is shown in Figure 8. In this figure, the seismophones are spread from $R_1$ to $R_{10}$ which, it is understood, is a spread of at least 3,000 feet, and a shot is recorded along this line of seismophones from shot point $S_1$. A single recorder $R_1'$ is then placed adjacent recorder $R_{10}$ and a shot is fired from shot point $S_2$ and recorded by the single seismophone $R_1'$. If desired, several seismophones may be located adjacent $S_2$; that is, a limited spread may be employed. The velocity may be determined by averaging the time paths of the seismic waves from $S_1$—$a$—$R_1$ with $S_2$—$b$—$R_1'$ to obtain $T_2$ in the formula:

$$V = \frac{X_1^2 - X_2^2}{T^2 - T_2^2}$$

The time path $S_1$—$c$—$R_{10}$ is used in obtaining $T_1$.

Where reflections of a distinctive character may be recorded with widely spaced seismometers, it is possible to practice our method with the arrangement shown in Figure 9, in which only two recorders or seismophones are used, located at $R_1$ and $R_2$, it being understood that the spread between these recorders is at least 3,000 feet. A shot is fired at $S_1$ and recorded at $R_1$ and $R_2$. Then a shot is fired at $S_2$ and recorded at $R_2$ and $R_1$. $T_1$ is the average of time paths $S_1$—$c$—$R_2$ and $S_2$—$c$—$R_1$, while $T_2$ is the average of the times of travel of the seismic waves over paths $S_1$—$a$—$R_1$ and $S_2$—$b$—$R_2$.

Where reflections lose their character close to the shot point, one of the methods shown in Figure 10, 10a or 11 may be employed. In Figure 10 a spread of seismometers from $R_1$ to $R_{10}$ is set up, removed some distance from shot point $S_1$. A shot is recorded along the spread from $R_1$ to $R_{10}$. The line of seismometers is then removed to extend from $R_1'$ to $R_{10}'$ and a second shot is recorded along the new line of seismometers from shot point $S_2$, it being noted that there is a gap between seismometer $R_{10}'$ and shot hole $S_2$ similar to that which exists between shot hole $S_1$ and seismometer $R_1$. The positioning of the nearest seismometer at some distance from the shot hole will prevent the obscuring of the reflections due to shot hole disturbances. It will be likewise understood that the major portion of the basement of the reflecting bed between shot holes $S_1$ and $S_2$ will be surveyed and the spread is such that velocity information can be obtained.

Another method is that shown in Figure 10a in which a line of seismometers extends from $R_1$ to $R_7$. Another line of seismometers in line with the first seismometer spread extends from seismometer $R_1'$ to $R_7'$. The second line of seismometers may be placed simultaneously with the first spread and a single shot fired from shot hole $S_1$ or a shot may be fired from shot hole $S_1$ and recorded at seismometer spread from $R_1$ to $R_7$ and then the spread moved to occupy positions extending from $R_1'$ to $R_7'$ and a second shot fired from shot hole $S_1$. In this case, the seismometer positions $R_1$ and $R_1'$ are removed from the shot hole. The arrangement is such that the disturbances close to the shot hole will not obscure the distinctive character of the reflections. In the arrangement shown in Figure 10a a portion of the basement is unsurveyed.

In Figure 11, the shot point $S_1$ is spaced from a line of seismometers extending from $x$ to $z$. A shot is fired from $S_1$ and recorded along the line of seismometers. If desired, the spread from $x$ to $z$ may be made in two parts, one extending from $x$ to $y$ and the other from $y$ to $z$ and two shots fired successively for the two seismometer spreads from shot point $S_1$. The distance from $x$ to $y$ need not be equal to that from $y$ to $z$, as will be clearly understood from a reference to the development of the formula described in connection with Figure 3.

Figure 12:
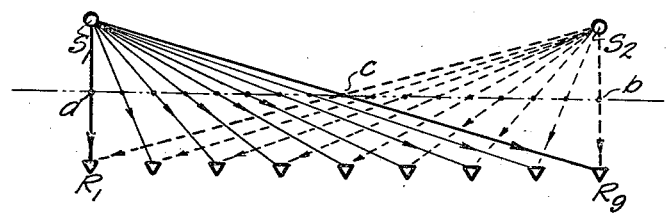
Figure 12 is a plan view of shot point and receiver disposition in still another embodiment of our invention of a method of determining the velocity of reflected seismic waves.
Figure 12A:
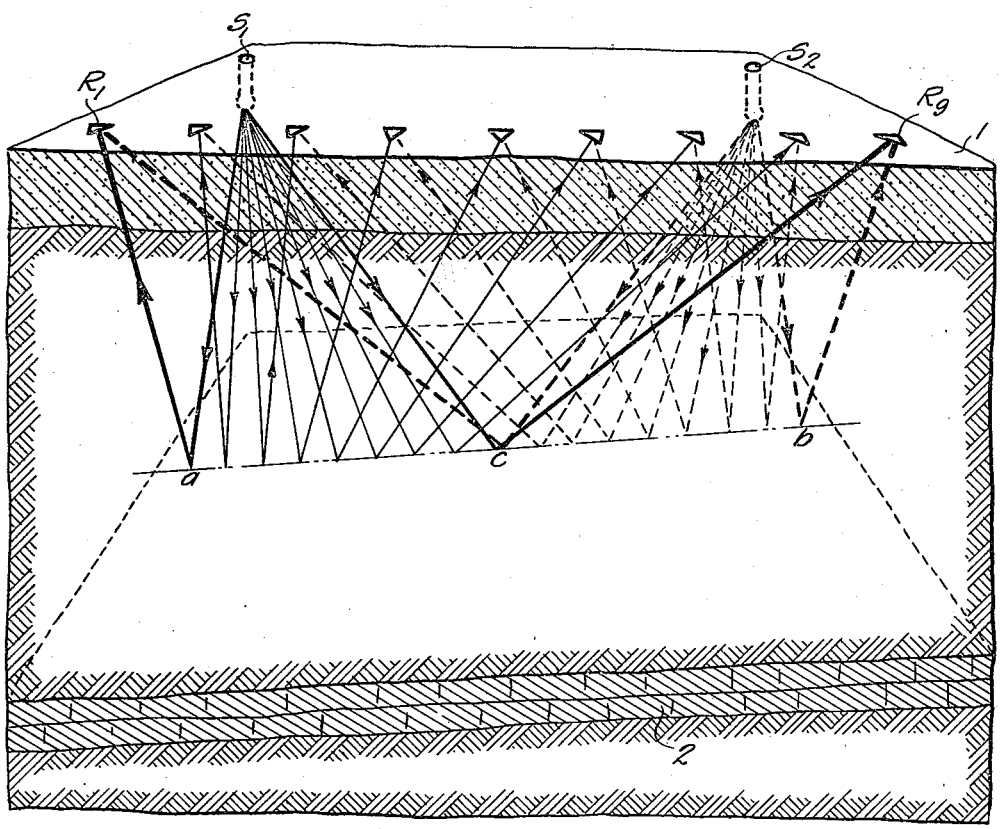
Figure 12a is a diagrammatic perspective view of the travel of seismic waves in the method of our invention, with the shot point and receiver disposition shown in Figure 12.

Referring now to Figure 12, we disclose another method of recording a reversed velocity set-up, that is, an arrangement in which a basement is surveyed both up-dip and down-dip for the purpose of making velocity determinations in which the loss of character of reflections close to the shot point is avoided. It will be observed that the arrangement in Figure 12 is analogous to that shown in Figure 2, except that the seismometer line extending from $R_1$ to $R_9$ is spaced from and parallel to a line extending between the shot holes $S_1$ and $S_2$. Figure 12 is a diagrammatic plan view of the arrangement showing the seismic wave travel paths, while Figure 12a is a perspective sectional view showing the paths taken by the seismic waves in practicing our method. A shot is fired from shot hole $S_1$ and recorded along the line of seismometers, thus giving reflections between points $a$ and $c$ from the reflecting bed 2, as can readily be seen by reference to Figure 12a. A shot is then fired from shot hole $S_2$ and received along the same line of seismometers, thus giving reflections along the line from $c$ to $b$ upon the reflecting bed 2. Travel paths $S_1$—$a$—$R_1$ and $S_2$—$b$—$R_9$ are averaged to obtain $T_2$ in making velocity determinations. Travel path $S_1$—$c$—$R_9$ is averaged with travel path $S_2$—$c$—$R_1$ to obtain $T_1$, in making the velocity determination. The salient feature of the process is the difference in the arrangement which enables velocity determinations to be made, namely the spread of more than 3,000 feet between $R_1$ and $R_9$.

Figure 13:
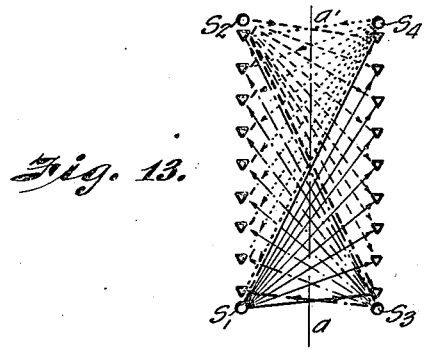
Figure 13 is a diagrammatic plan view showing shot point and receiver disposition capable of carrying out the method of our invention for determining the velocity of reflected seismic waves.
Figure 13A:
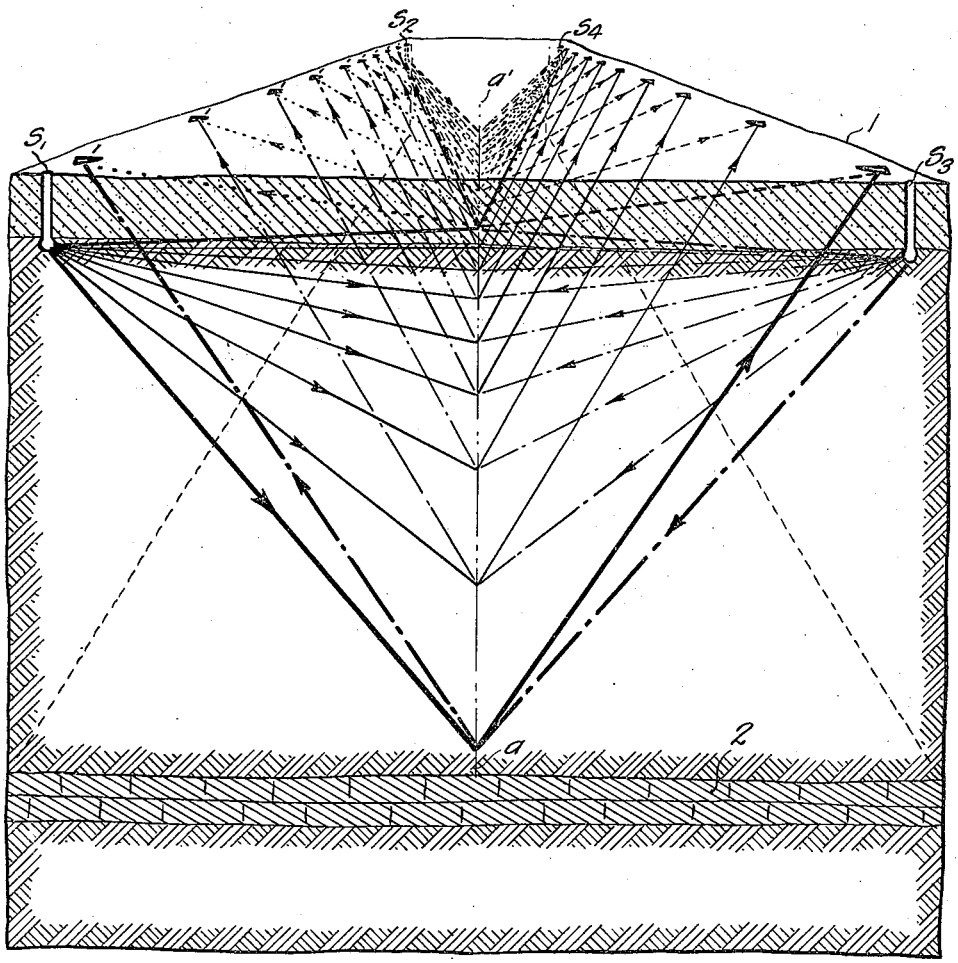
Figure 13a is a diagrammatic perspective view of the paths of seismic waves in the arrangement shown in Figure 13.

Referring now to Figures 13 and 13a, it will be seen that we have provided a method in which two pairs of shot holes, namely $S_1$ and $S_2$, and $S_3$ and $S_4$ are employed. With the line of seismometers extending between shot holes $S_1$ and $S_2$ shots are recorded from shot holes $S_3$ and $S_4$. The line of seismometers are then moved to extend between shot holes $S_3$ and $S_4$ and shots are fired from shot holes $S_1$ and $S_2$ and recorded along the line of seismometers extending between shot holes $S_3$ and $S_4$. This gives the double coverage of the line on the reflecting horizon 2 between $a$ and $a'$ so that two reversed profiles are completed and the time data available therefrom enables velocity determinations to be made. This method not only provides for two velocity determinations along the same line, but may be employed in areas where reflections lose their character from shot point interference. The method is further unique in that weathering corrections can be made readily at each end seismometer position by observing the first arrival times at the seismometers nearest the shot point or by recording the first arrivals from all four shot points at both lines of seismometer positions.

Referring now to Figures 14 and 14a, double basement coverage along two intersecting lines may be obtained, enabling very accurate velocity determinations to be achieved. With a line of seismometers extending between shot holes $S_2$ and $S_4$ and a spread of seismometers extending between shot holes $S_4$ and $S_3$, a shot is fired at shot hole $S_1$ and recorded along the two lines of seismometers extending at right angles to each other. The line of seismometers between shot holes $S_3$ and $S_4$ is then moved to extend between shot holes $S_1$ and $S_2$ and a shot is fired from shot hole $S_3$. The line of seismometers from $S_2$ to $S_4$ is then moved to spread between shot holes $S_1$ and $S_3$ and a shot fired from shot hole $S_4$. The line of seismometers which extends between shot holes $S_1$ and $S_2$ is then moved to spread between shot holes $S_3$ and $S_4$, and a shot is fired from shot hole $S_2$ and recorded along the line of seismometers extending between shot holes $S_1$ and $S_3$ and along the spread of seismometers between shot holes $S_3$ and $S_4$. It will be observed that the foregoing method is a combination or the simultaneous practice of the methods shown in Figures 12, 12a, 13, and 13a, and more particularly the method of Figure 13 repeated at right angles in order to obtain two paths of velocity determinations at the central point. It is to be understood, of course, that the method of Figures 14 and 14a may be practiced with only one side of the right angle spread in place at one time. For example, the line of seismometers between shot holes $S_1$ and $S_2$ may be shot from both shot holes $S_3$ and $S_4$. The line may then be moved to extend between shot holes $S_1$ and $S_3$ and two shots recorded from shots at shot holes $S_2$ and $S_4$, and the method continued around the quadrilateral figure.

Figures 15, 15A:
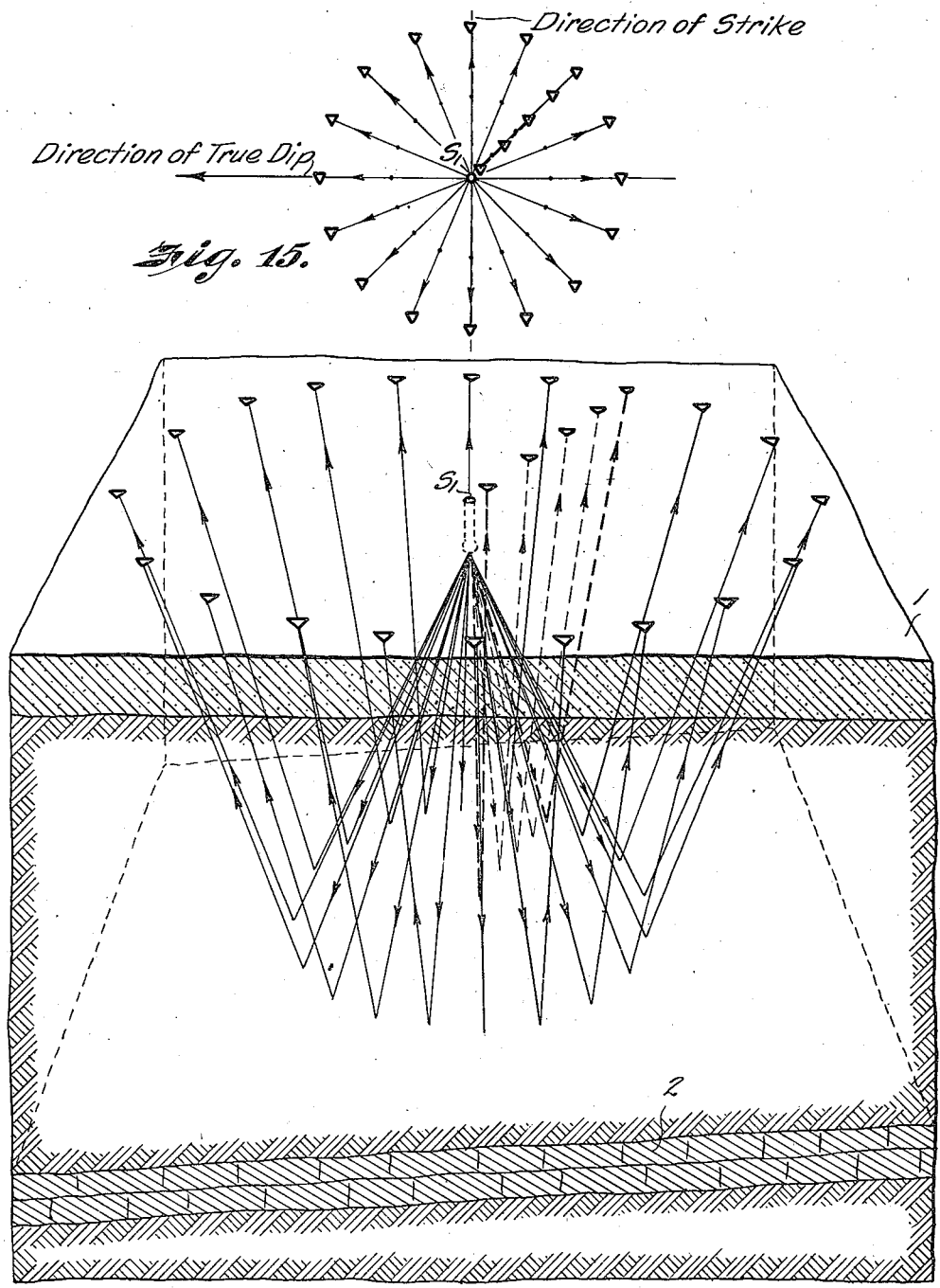
Figure 15 is a diagrammatic plan view showing the disposition of shot point and receivers in still another embodiment of our method of determining the velocity of reflected seismic waves.
Figure 15a is a diagrammatic perspective view showing the path of travel of the seismic waves in the arrangement shown in Figure 15.

Another embodiment of our invention is shown in Figures 15 and 15a in which the seismometers are spread around the circumference of a circle at whose center is the shot point. The spread also includes a line of seismometers along a radius of the circle. The shot is fired from a shot point and recorded at all of the seismometers. By using the travel time to the seismometer near the center of the circle in conjunction with the average travel times to the circumferentially located seismometers, a velocity may be determined which is substantially independent of dip. In this case, the travel time from the shot point to the seismometer located nearest the shot point would be $T_2$ and the average of the travel times from the shot point to the circumferentially located seismometers would be $T_1$.

Figure 16:
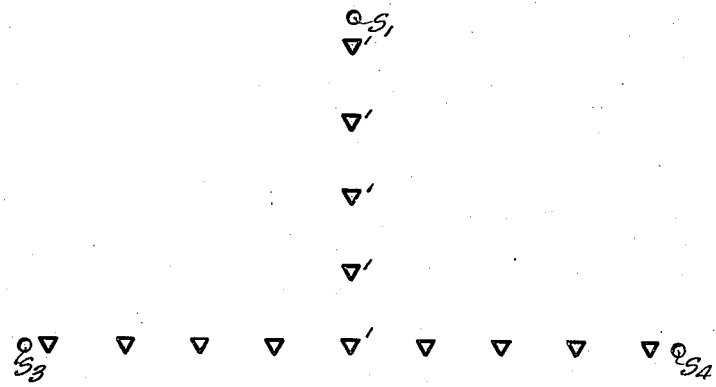
Figure 16 is a plan view of another arrangement of shot points and receivers capable of carrying out the method of our invention for determining velocity of reflected seismic waves.

Referring now to Figure 16, a shot is fired at shot point $S_1$ and recorded along the line of seismometers extending between shot holes $S_1$ and $S_2$. With the seismometers in the same position, a shot is then recorded from shot hole $S_2$. Then the seismometers are used to extend between shot holes $S_3$ and $S_4$ and a shot fired from shot hole $S_3$. With the seismometers in the same position a shot is then fired from shot hole $S_4$. The above method may be used in shooting from $S_3$ and $S_4$ when seismometers are spread between $S_1$ and $S_2$. Similarly, the method may be used in shooting alternately from $S_1$ and $S_2$ when seismometers are spread between $S_3$ and $S_4$.

Figure 17:
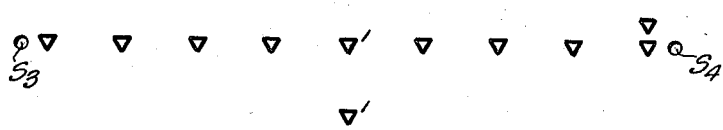
Figure 17 is still another plan view of a further arrangement of shot points and receivers capable of carrying out the method of our invention for determining velocity of reflected seismic waves.

In Figure 17, the method pursued is similar to that in Figure 16, except that an additional line of seismometers spreads between shot holes $S_1$ and $S_4$. The shot from shot hole $S_1$ is recorded along the line of seismometers between $S_1$ and $S_5$ and along the line of seismometers from $S_1$ to $S_4$ simultaneously. The shot from $S_5$ is recorded along the spread from $S_5$ to $S_1$. The shot fired at shot point $S_3$ is recorded along the line of seismometers from $S_3$ to $S_4$ and the shot at $S_4$ is recorded simultaneously along the line of seismometers extending from $S_4$ to $S_1$, as well as along the line of seismometers extending from $S_4$ to $S_3$. These methods provide more than one velocity determination so that the respective velocity determinations may be averaged to more closely approach an accurate value for the area between the four shot holes.

In the methods shown in Figures 2, 5, 6, 7, 8, and 9, the corrections for surface weathering and elevation differences may be more accurately obtained by drilling each shot point to a given datum or by drilling each shot point to some given near surface geological stratum. The direct waves from the shot points to the surface in such case would then supply quite accurate data.

It will be noted that, in most of the methods illustrated, reversed shots are disclosed as having equal recording spreads. It will be observed from the formulae developed in connection with Figure 3 that a reversed shot of unequal length is also useful and gives results which would be independent of dip.

We have emphasized, in the practice of our method, that the distance between end seismometers in the spread must be in excess of 3,000 feet in order to obtain accurate velocity determinations. It is to be understood, of course, that this is the lowest length which can be employed in the practice of our method. Normally, the spread is much greater than this and may be as much as 6,000 feet to 8,000 feet or even more, if reflections can be traced to such distant seismometers. One of the peculiar advantages of our method is that it provides for and takes advantage of the shortest possible time path to a reflecting bed in combination with the longest time path readily obtainable on correlated reflections.

Our method of employing continuous chains of recording positions spaced linearly and in proper relationship to the source, provides a definite means of correlation between the shortest and the longest time path reflections.

By the peculiar disposition of recording positions, and shot holes in our method, near surface weathering corrections and corrections for surface topography may be easily achieved.

By shooting and recording profiles in reversed direction, that is, both up-dip and down-dip over a length of the reflecting horizon, or both up-dip and down-dip on adjacent lengths of a reflecting horizon, the errors due to unknown dip, present in the prior art, are greatly minimized, if not substantially eliminated.

The formulae disclosed for use in conjunction with the practice of our method are based on straight line paths, that is, paths of uniform and constant velocity in the medium below the weathering. It will be understood, by those skilled in the art, that this is not exactly the case in practice, since the velocity will increase with the depth and the paths actually will be curved lines.

In any given area, however, the velocity-depth relation will follow the same general shape. Since we are dealing with averages, we may make the straight line path assumptions and obtain the desired result permitting us, by means of our method, to predict small changes in velocity with considerable precision, even though the determination of the exact total magnitude of the velocity in any particular spot may seem in error. It will be clear to those skilled in the art that the assumptions made will result in the absolute values of velocity being somewhat erroneous but that, on the other hand, the relation of the velocities, one to the other, will be more nearly accurate.

Our methods, therefore, are peculiarly adapted in determining seismic velocity differences.

In making geophysical surveys by seismic methods to obtain dip, datum, and divergence determinations, we prefer to obtain the continuous profiles of the subsurface strata. One method of doing this is disclosed in Figure 18, in which a line of seismometers $R_1$ to $R_{10}$ is spread between shot points $S_1$ and $S_2$. A shot is first fired at $S_1$ and then fired at $S_2$ and records made from each shot. It is to be understood, in shooting for dip, datum, and divergence determinations, the length of the seismometer spread does not exceed 3,000 feet and is normally a few hundred feet. This distinguishes shooting for dip, datum, and divergence determinations from the method of shooting just described for making velocity determinations. The shot from shot point $S_1$ with the seismometers spread between shot holes $S_1$ and $S_2$ will give reflections from the reflecting stratum 2 between points $a$ and $b$, indicated on the drawing as record #1. The shot from shot hole $S_2$ with the seismometers remaining in place will give reflections from stratum 2 between points $b$ and $c$ indicated in Figure 18 as record #2. We then move the seismometers to occupy the positions from $R_1'$ to $R_{10}'$ between shot holes $S_2$ and $S_3$. A second shot is then fired from shot hole $S_2$ and recorded along the new seismometer positions. This gives reflections on the stratum 2 between points $c$ and $d$ indicated in Figure 18, as record #3. With the seismometers in the position between shot holes $S_2$ and $S_3$, a shot is fired from shot hole $S_3$ thus obtaining reflections between points $d$ and $e$ on the reflecting stratum 2 and giving record #4 of Figure 18.

Figures 18, 22:
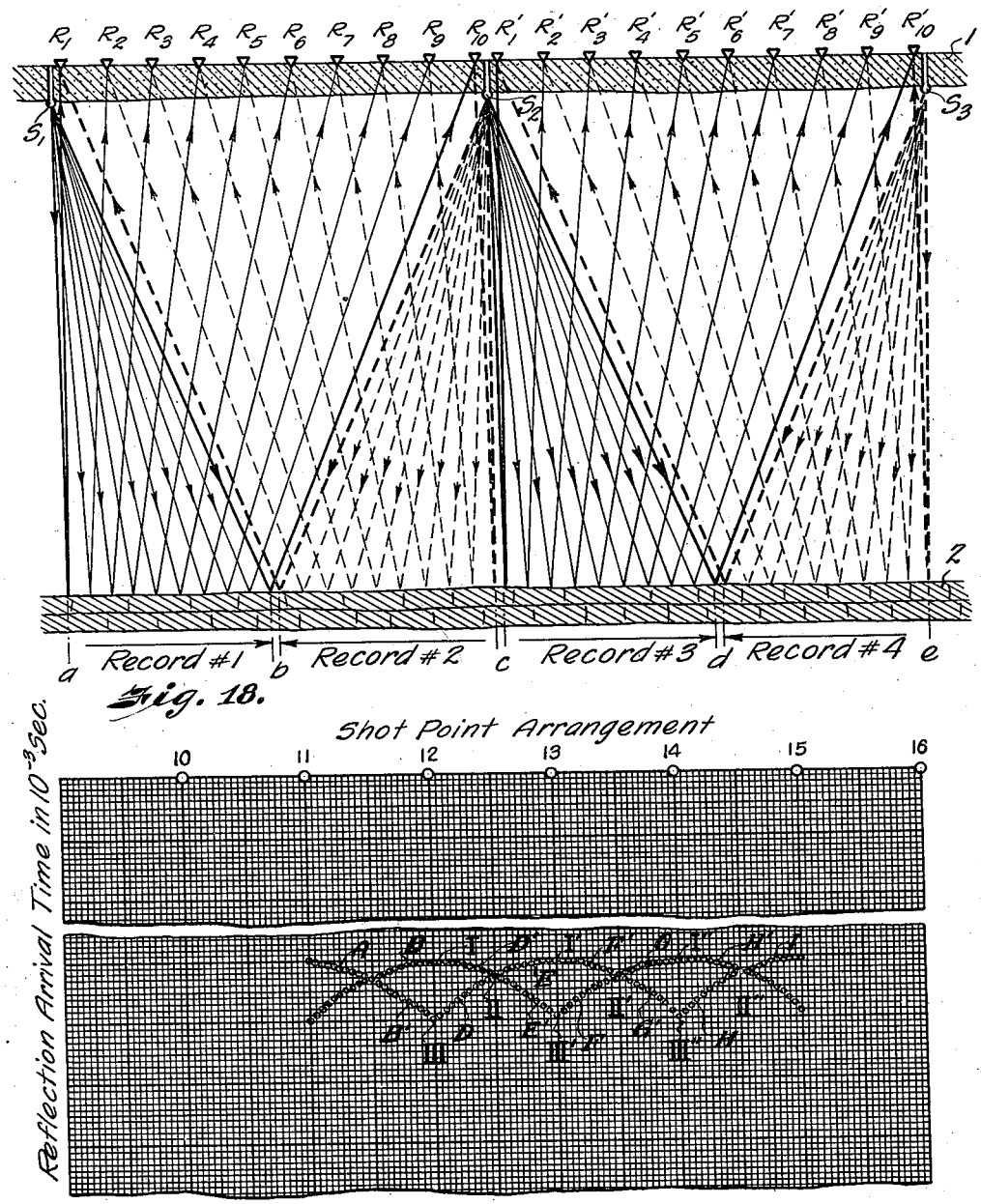
Figure 18 is a diagrammatic elevation showing shot point and receiver positions adapted for employment in carrying out the method of continuous profiling shown in the co-pending application of Athy et al., Serial No. 245,653.
Figure 22 is a time cross section, showing the travel times from reflections obtained from the seismic surveying method shown in Figures 21 and 21a, in which time is plotted with respect to half the distance.

The method described in Figure 18 materially extends the usefulness of seismograph exploration. We have found, however, that the data obtained even from this method leaves much to be desired in places where we wish to establish in great detail, the contour shape, size and configuration of the substrata.

Figure 19:
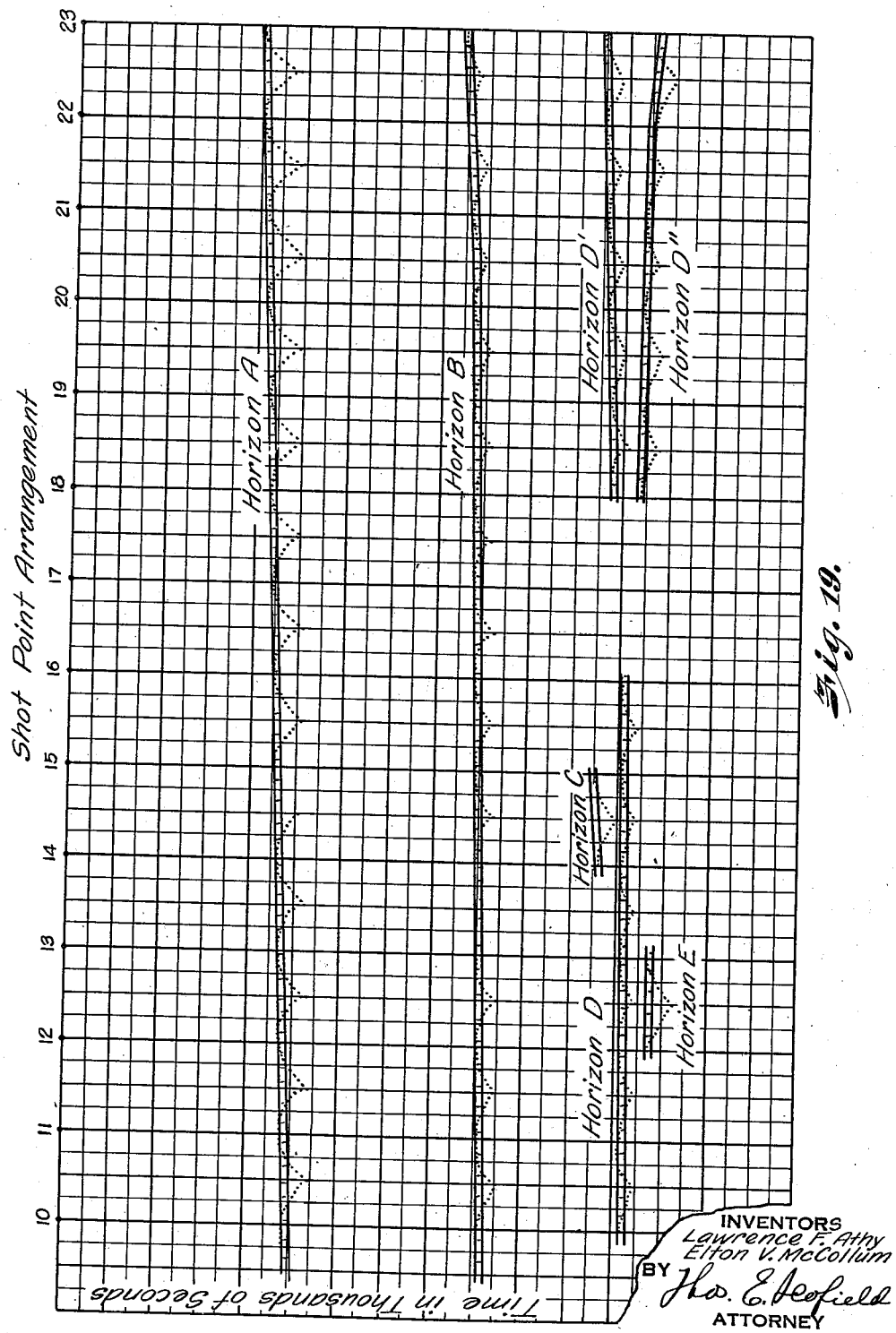
Figure 19 is a diagrammatic view of a time cross section of a portion of the earth obtained by the continuous profiling method shown in Figure 18, in which time is plotted with respect to half the distance.

Referring now to Figure 19, we have shown a time cross section on which is plotted the travel times of reflections to various recorders below the shot points corresponding approximately to the reflection point on the substrata. In plotting time distance curves, we have plotted time with respect to half the distance. It will be obvious, from Figure 18, that the time of travel of the seismic wave from shot point $S_1$ to reflecting point $b$ to seismometer $R_{10}$ will be greater than that occupied in traveling the path $S_1$—$a$—$R_1$ even if the reflecting stratum is flat, because of the greater distance from the shot point $S_1$ to the recorder $R_{10}$. For this reason, the times form curved patterns as shown by the dots in Figure 19. It will also be observed that the times will show more pronounced curves for shallower beds than from deeper reflecting horizons.

Still referring to Figure 19, it will be observed that there is a gap in reflecting horizon D between shot points 16 and 18. A reflecting horizon D' and a reflecting horizon D'' of fairly continuous character are established again, beginning below shot point 18 and extending toward shot point 23.

From the information obtained from the shooting and plotted in Figure 19, it is impossible to tell whether horizon C joins horizon D' or whether horizon D joins horizon D' or D''. It is quite possible that horizon E might join horizon D''.

We have found that, by multiple coverage of the substrata below the shot points, that the plurality of records thus obtained over the same basement will give additional values enabling us to complete the survey.

By occupying field and recording stations and shooting from the shot points according to the method which will be described hereinbelow, we are enabled to obtain the desired multiple coverage and thus obtain more complete information.

Figure 20:
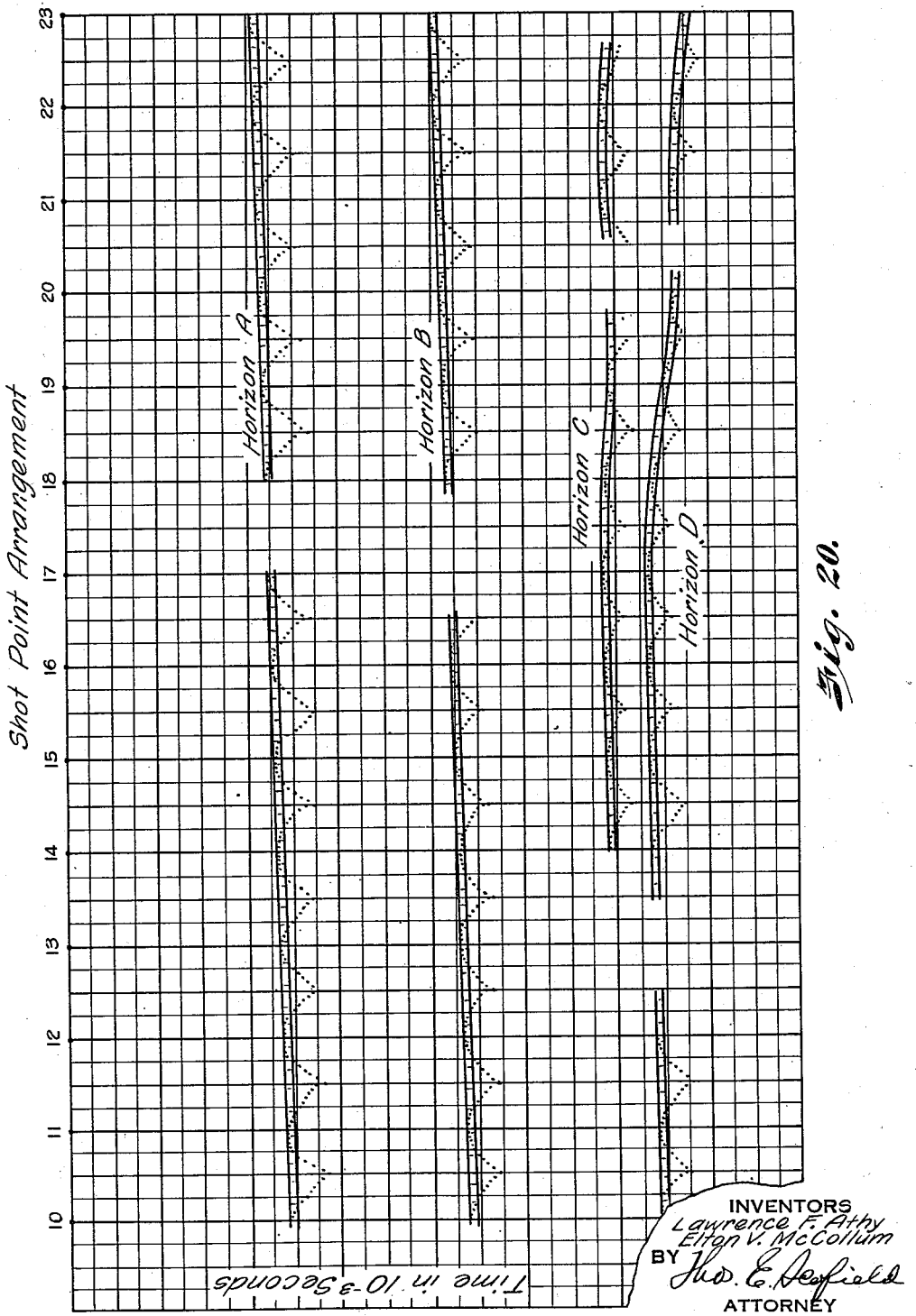
Figure 20 is a diagrammatic view showing a time cross section of the same substrata as shown in Figure 19, covered a second time, in which time is plotted with respect to half the distance.

Referring now to Figure 20, we have shown another time section covering the same substrata showing the different results obtained in shooting the same area a second time. It will be observed that the gap in horizon D between shot points 16 and 18 is now bridged and that some of the information present in Figure 19 does not appear, while additional information appears in Figure 20. It will be clear to those skilled in the art that the time sections 19 and 20, together, are greatly more valuable than either of these time sections by itself.

Figures 21, 21A:
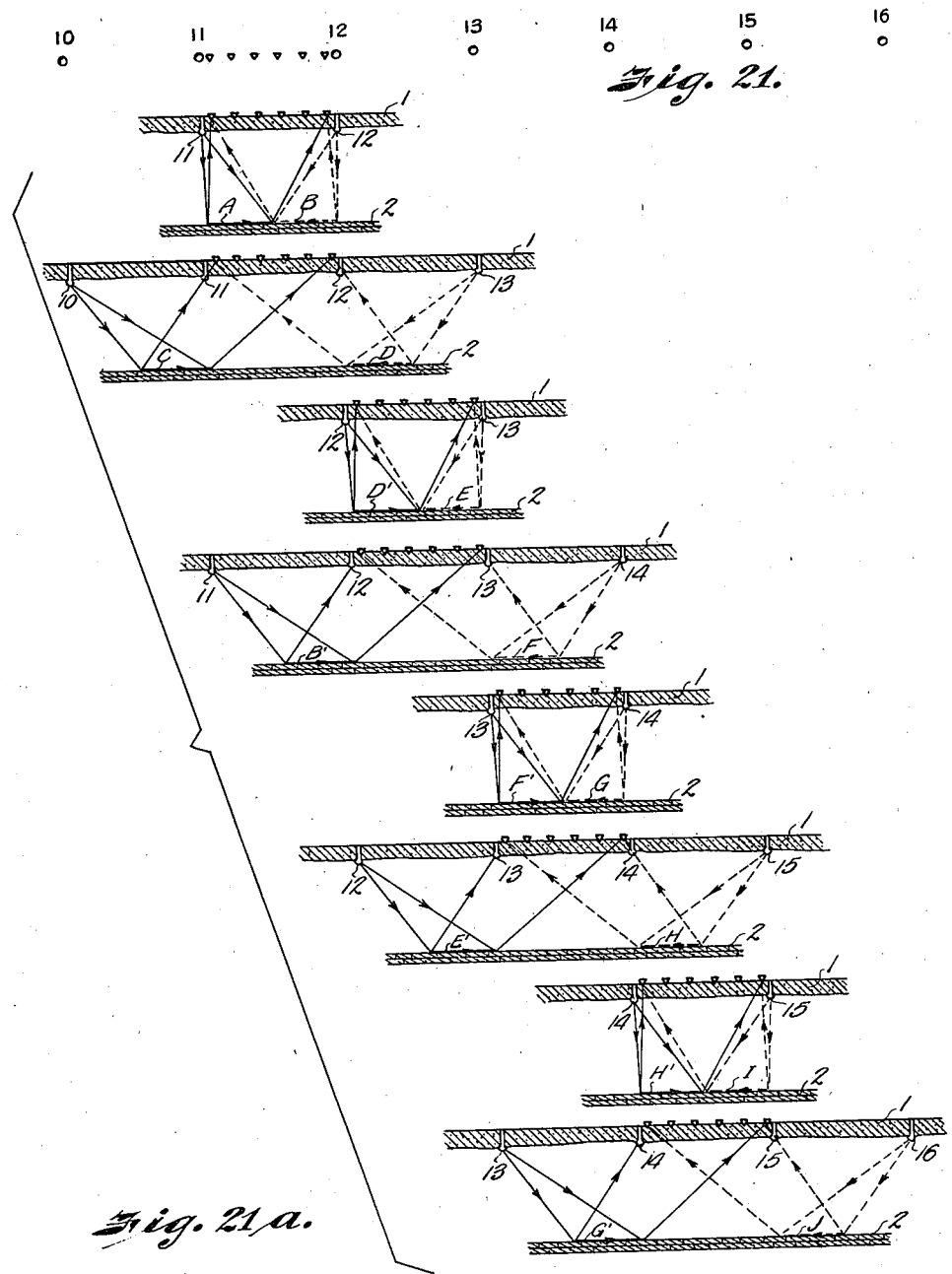
Figure 21 is a top plan view showing a line of shot holes with receivers positioned between one pair of shot holes.
Figure 21a is a diagrammatic view showing one method of multiple coverage seismic surveying for the obtaining of dip, datum, and divergence which provides the proper travel time-distance data for more than one determination of dip, datum, and divergence over a linear reflected segment, the method being practiced along the line of shot holes shown in Figure 21.

Referring now to Figure 21, we have shown a line of shot holes 10, 11, 12, 13, 14, 15, and 16. In Figure 21a, we have shown a plurality of sections below certain of the shot holes in Figure 21. The various parts of Figure 21a being taken together will illustrate one embodiment of our invention. With a seismometer spread between shot holes 11 and 12, a shot is fired first from shot hole 11 to give a record along the line A on the reflecting stratum 2. With the seismometers left in place, a shot is fired from shot hole 12, thus giving reflections along the line B on the reflecting stratum 2. With the seismometers still left in place between shot holes 11 and 12, a shot is fired from shot hole 10, giving reflections along the line C on the substratum 2. With the seismometers still left in place, a shot is then fired from shot hole 13, giving reflections along the line D of substratum 2. Then the seismometers are moved to extend between shot holes 12 and 13, and a shot fired from shot hole 12, giving reflections along the line D' in the reverse direction along the line D, from that obtained from the previous shot at shot hole 13. Then a shot is fired from shot hole 13 with the seismometers in the second position, which gives a record of reflections along the line E on the reflecting stratum 2. With the seismometers still remaining between shot holes 12 and 13, a shot is then fired from shot hole 11. This gives reflections along the line B', which covers the same line as record B, but in a reverse direction. With the seismometers still left in the position between shot holes 12 and 13, a shot is then fired from shot hole 14, giving reflections along the line F on reflecting stratum 2. The seismometers are then moved to extend between shot holes 13 and 14, and a shot fired from shot hole 13, giving the reflections along the line F' on the substratum 2, covering the same segment of the reflecting stratum as record F, but in a reverse direction. A shot is then fired from shot hole 14, giving reflections along the line G on the reflecting stratum 2. The seismometers are still left in their position between shot holes 13 and 14, and a shot fired from shot hole 12. This gives reflections along the line E' which covers the same line as covered by record E but in the opposite direction. The seismometers still remaining between shot holes 13 and 14, a shot is fired from shot hole 15, giving reflections along the line H. The seismometers are then moved to occupy positions between shot holes 14 and 15 and a shot fired from shot hole 14. This gives reflections along the line H' on the reflecting stratum 2, which is the same segment of the reflecting stratum from which record H was made but the record is obtained in the opposite direction. A shot is then fired from shot hole 15 and a record made of reflections along the line I of the reflecting stratum 2. With the seismometers remaining between shot holes 14 and 15, a shot is then fired from shot hole 13 and received at the seismometers to give a record of reflections along the line G' on the reflecting stratum 2. The record G' is one of reflections from the same line as record G but in the reverse direction. A shot is then fired at shot hole 16, the seismometers remaining unmoved, and a record made along the line J on the reflecting stratum 2.

A time cross section of the records obtained from the method of Figure 21a is shown in Figure 22. In Figure 22, the record letters of Figure 21, from which the travel times were plotted, are shown. It will be observed that, at point I, under shot point 12 in Figure 22, there are two determinations of the same travel time. One is obtained from record B of Figure 21a and the other is obtained from record D' of Figure 21a. The point II in Figure 22 has four determinations of the same travel time. They are obtained from the records D, D', E and E' of Figure 21a. The point III on Figure 22 has two determinations of the same travel time. One is obtained from record D and the other is obtained from record B'.

The complete pattern of travel times from shot points 11 through 15 is shown in Figure 22.

Theoretically, the two observations at point I should agree and the four observations at point II should be the same. Similarly, both observations at point III should be identical. In a practical case, however, it will be found that there are some discrepancies. These are caused by the application of near surface corrections which are in error or by the influence of near surface waves superimposed or heterodyned with the reflection wave form on the record and by the fact that both the paths are theoretically nearly duplicated, though they may not actually be so duplicated in practice because of the dip of the reflecting horizon.

Figures 23, 23A:
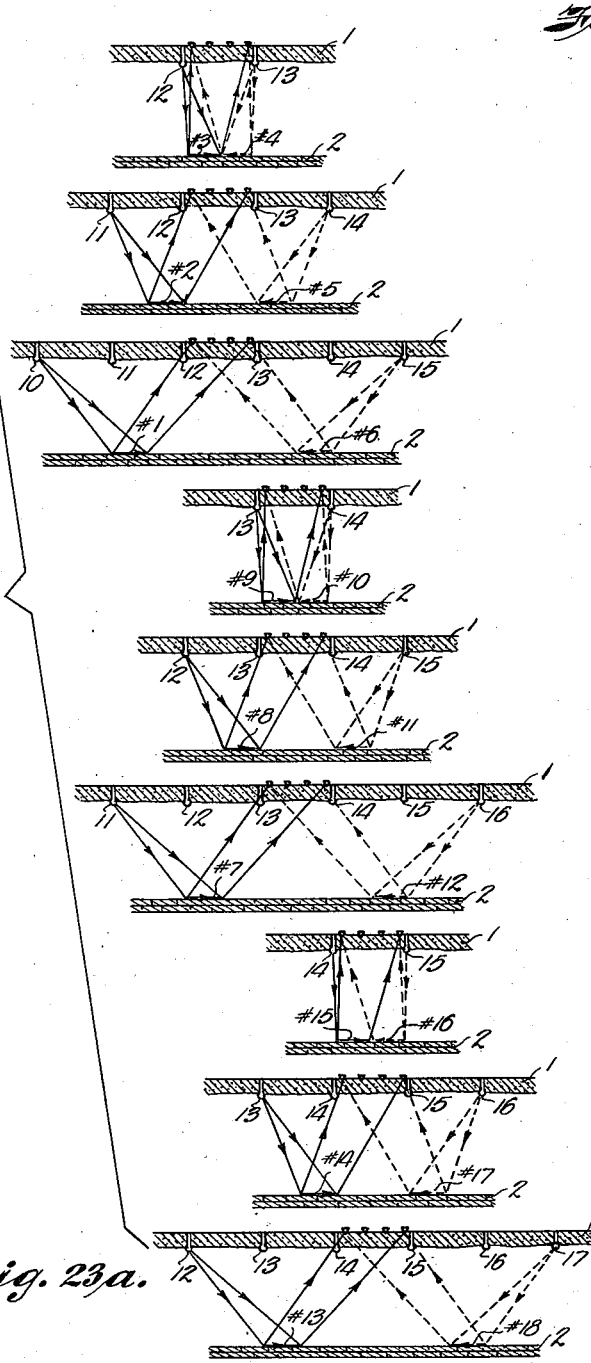
Figure 23 is a plan view showing a line of shot holes.
Figure 23a is a diagrammatic view of a plurality of sectional elevations at various places along the line of shot holes shown in Figure 23, illustrating another multiple coverage method of shooting for dip, datum, and divergence, which provides the proper travel time-distance data for more than one determination of dip, datum, and divergence over a linear reflected segment.

The pattern of arrival times shown in Figure 22 is that which would be theoretically obtained. When duplicate times fail to agree, adjustments must be made, by any number of methods of closing open loops, well known to the art of closures. In practice, we prefer to average all determinations of duplicate paths casting out any observations that may appear to be wild. Determinations of dip, datum, and divergence may be based on average times represented by I, I', I''; II, II', II'' and III, III', III'' which will yield a final result of the reflecting horizon appreciably more accurate and reliable than any of the methods of the prior art.

Where more complete data is required than that obtainable from the method of seismic surveying shown in Figure 21a, which gives the travel time pattern shown in Figure 22, the method of seismic surveying shown in Figures 23 and 23a may be employed. In Figure 23, a line of shot holes is shown.

In Figure 23a the consecutive steps of our method in the particular embodiment being described are shown. A line of seismometers is spread between two shot holes, say 12 and 13. A shot is fired from shot hole 12 and a record is made of reflections from a line #3 on the reflecting stratum. Then, with the seismometers left in position, a shot is fired from shot hole 13, giving a record from the line #4 on the reflecting stratum. Then, without moving the seismometer spread, a shot is fired from shot hole 11 and a record made of reflections from the line #2 on the reflecting stratum. With the seismometers still in the same position, a fourth shot is fired from the shot point 14 and a record of reflections made along the line #5. With the seismometers still left in the same position, that is between shot holes 12 and 13, a shot is fired from shot hole 10 and reflections recorded along the spread of seismometers along the line #1 of the reflecting stratum. Then, without moving the seismometers, the sixth shot is fired from shot hole 15, giving a record of reflections along the line #6. After the six shots have been fired, the seismometers are moved to extend between shot holes 13 and 14. Then a shot is fired from shot hole 13 and reflections recorded along the line #9 on the reflecting stratum. Then a shot is fired from shot hole 14, giving a record of reflections from the line #10 on the reflecting stratum. Similarly, without moving the seismometers, shots are fired from shot holes 12 and 15, in succession, giving successive records of reflections along lines #8 and #11, respectively. Then, without moving the seismometer spread between shot holes 13 and 14, the fifth shot is fired from shot hole 11 to give a record of reflections along line #7 on the reflecting stratum and the sixth shot is fired from shot hole 16, giving a record of reflections along the line #12 of the reflecting stratum. Then the seismometers are moved to extend between shot holes 14 and 15 and the process repeated by successive shots from shot holes 14, 15, 13, 16, 12, and finally from shot hole 17 to give respective reflections along lines #15, #16, #14, #17, #13, and #18 on the reflecting stratum.

Figure 24:
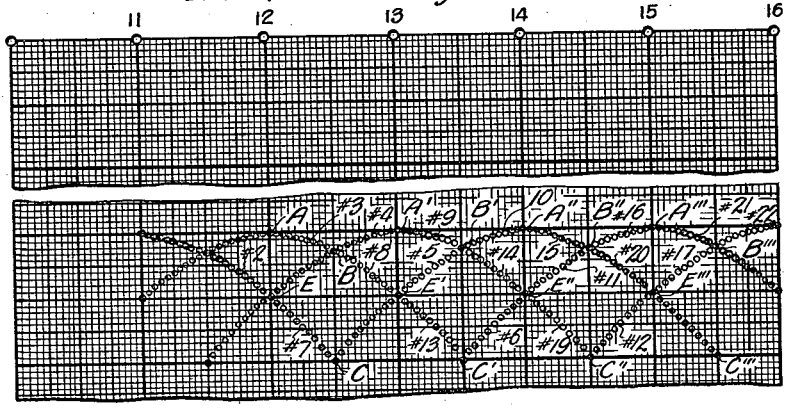
Figure 24 is a time cross section showing the comprehensive time pattern obtained from a single reflecting horizon by the method shown in Figures 23 and 23a, in which time is plotted with respect to half the distance.

Referring now to Figure 24, we have shown the travel time pattern obtained by shooting in the manner shown in Figure 23a. It will be seen that point A' has two determinations of the same travel time. One is obtained from record 4 and the other obtained from record 9. Point B' has four determinations of the same travel time found on records 5, 9, 10, and 14 respectively. Point B'' likewise has four determinations of the same travel time. One is found on record 6 from shot point 15, the second on record 11 from shot point 15, the third is found on record 14 from shot point 13, the fourth is found on record 19 from shot point 13. Point C' has two determinations of the same travel time. One is from shot point 15 and is found on record 6 and the second is from shot point 12 and is found on record 13.

On Figure 24, the record numbers from which the time patterns were laid out are indicated. Thus that portion of the time pattern between points A and B was made from record #3, between points B and A' from record #4, between A' and B' from record #9, between B' and A'' from record #10, etc.

Similarly, the time pattern between points B and E' was made from record #8, between E' and B' from record #5, between B' and E'' from record #14, and between D'' and B'' from record #11. Similarly, the time pattern between points E and C was made from record #7, between points E' and C' from record #13, between C' and E'' from record #6, between E'' and C'' from record #19, etc., as will be clear from a reference to Figure 24.

It will be observed that the comprehensive time pattern illustrated in Figure 24 is obtained from a single reflecting horizon. The accumulation of data here permits many checks and re-checks of travel times to a given substratum point. By shooting additional holes from a given spread in the same manner as illustrated in Figure 23a, even more data may be obtained and this is contemplated by and is within the scope of our method.

Figure 25A:
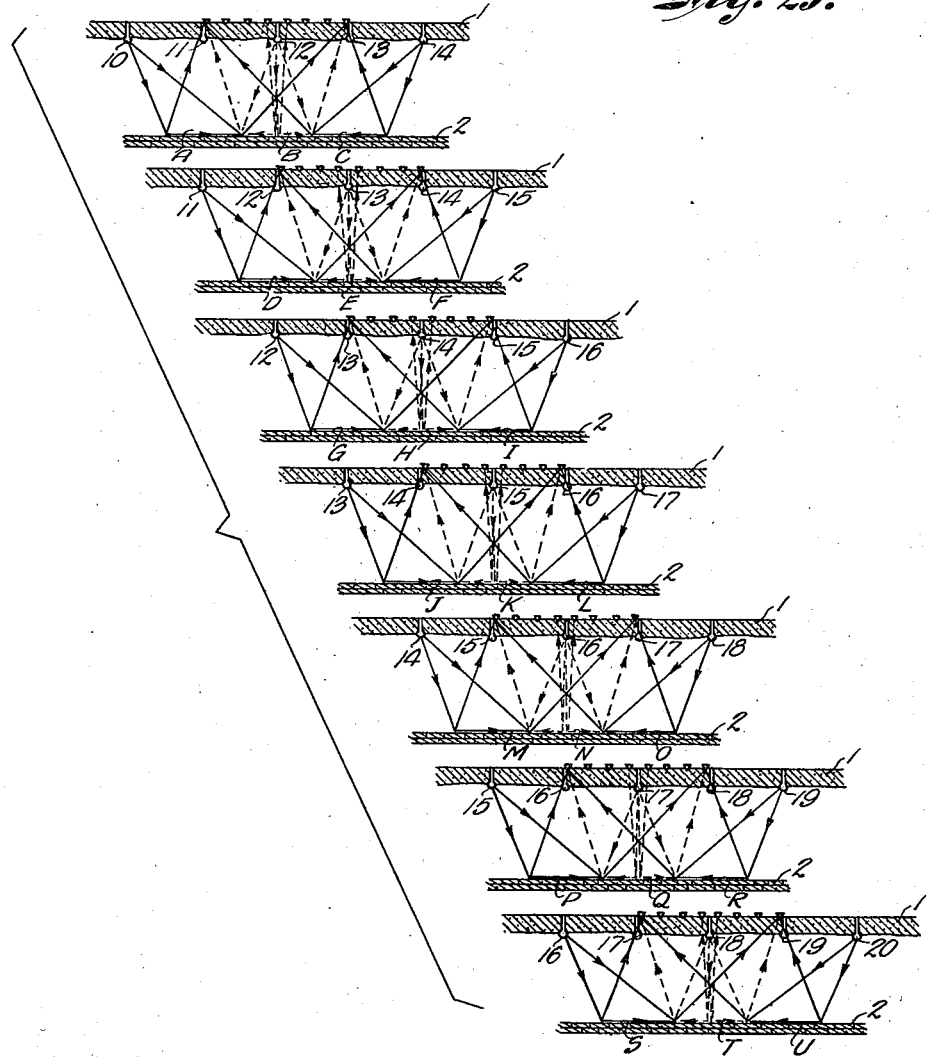
Figure 25a is a plurality of sectional elevations taken along the line of shot holes shown in Figure 25, illustrating a further multiple coverage method of shooting for dip, datum, and divergence over a linear reflected segment.

Referring now to Figures 25 and 25a; Figure 25 shows a line of shot holes and Figure 25a shows the successive steps of the method for obtaining multiple coverage data, by a plurality of diagrammatic partial sectional elevations showing the seismic wave extreme paths. Seismometers are spread between shot holes 11 and 12 and between shot holes 12 and 13. A shot is fired from shot hole 10 and recorded with the spread. A shot is then fired from shot hole 12 and recorded with the spread, and finally a shot is fired from shot hole 14 and recorded. The seismometers between shot holes 11 and 12 are then moved to extend between shot holes 13 and 14, while those seismometers which are positioned between shot holes 12 and 13 are left remaining in place. Then a shot is fired from shot hole 11, followed by shots from shot holes 13 and 15. The seismometers which had remained between shot holes 12 and 13 are then advanced to extend between shot holes 14 and 15, while those between shot holes 13 and 14 are left in place. Shots are then fired in succession from shot holes 12, 14, and 16, and records made. The procedure is then repeated, as will be clear from the foregoing description and Figure 25a.

Figure 26:
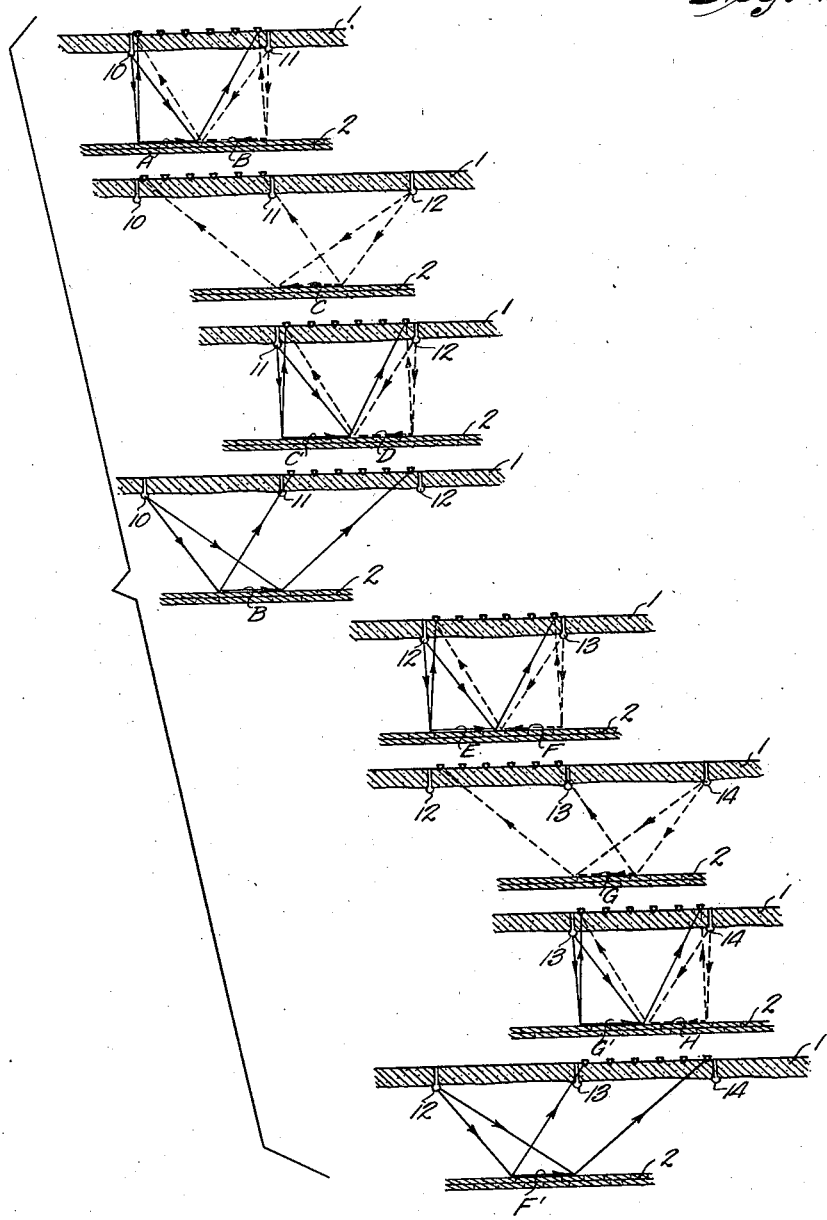
Figure 26 is a plan view of a line of shot holes.

Another mode of multiple coverage shooting for dip, datum, and divergence in accordance with our invention is shown in Figures 26 and 26a. A line of seismometers is spread between shot holes 10 and 11 and successive shots fired at shot holes 10 and 11. The seismometers are left remaining in place and a shot is then fired from shot hole 12. The seismometer spread is then moved to extend between shot holes 11 and 12, and successive shots fired from shot holes 11 and 12. Then, with the spread left in place, a shot is fired from shot hole 10. Then the seismometer spread is moved to extend between shot holes 12 and 13, and successive shots recorded from shot holes 12 and 13, respectively. With the seismometers left in place, a shot is then recorded from shot hole 14 and the procedure repeated as will be clear to those skilled in the art, from the foregoing description and Figure 26a.

Another mode of multiple coverage shooting within the scope of our invention is disclosed in Figures 27 and 27a. Figure 27 represents a plan view of a line of shot holes, and Figure 27a shows the successive steps of the method in a plurality of fragmentary sectional elevations along the line of shot holes shown in Figure 27. Seismometers are spread between shot holes 10 and 11 and between shot holes 11 and 12. A single shot is then fired from shot hole 11. Then a short spread is formed over shot hole 11 by the removal of seismometers adjacent shot holes 10 and 12. Then a shot is fired from shot holes 10 and 12 successively and records made. The removal of the seismometers from adjacent the shot holes precludes the masking of the record by shot hole disturbances.

A spread of seismometers is then positioned between shot holes 11 and 12 and another between shot holes 12 and 13. A single shot is then fired from shot hole 12. Then a short spread is positioned around shot hole 12 and shots recorded in succession from shot holes 11 and 13, and the procedure repeated, as will be clear from reference to Figure 27a.

Figure 28:
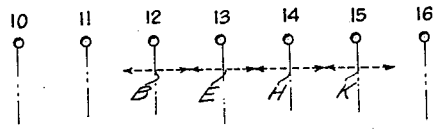
Figure 28A:
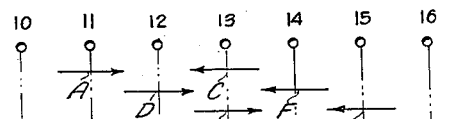
Figure 28B:
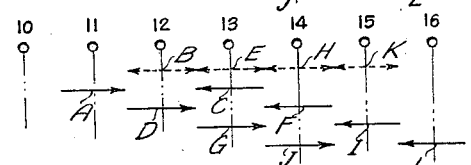

Referring now to Figure 28 and Figure 25a, it will be seen that the shot from shot hole 12 will give record B, that the shot from shot hole 13 will give record E, that the shot from shot hole 14 will give record H, that the shot from shot hole 15 will give record K, etc. In other words, with the double spread on each side of the shot point, the basement underneath the shot hole is covered and the arrangement is such that continuous coverage is obtained, as will be apparent from Figure 28. Referring now to Figure 28a and Figure 25a. It will be seen that the shot from shot hole 10 will give the record A, and the shot from shot hole 14 will give record C. Similarly, the shot from shot hole 11 will give record D and the shot from shot hole 15 will give record F, while the shot from shot hole 12 will give record G and the shot from shot hole 16 will give record I, while the shot from shot hole 13 will give record J and that from shot hole 17 will give record L, etc. Records A, D, C, F, and I, or A, D, G, J, and I give continuous coverage. The combination of all of the records taken by the method of shooting in Figure 25a is shown in Figure 28b, clearly indicating the multiple coverage obtained. The area under shot hole 12 has double coverage, that under shot hole 13 has triple coverage, that under shot hole 14 triple coverage, that under shot hole 15 double coverage, etc.

Figure 29:
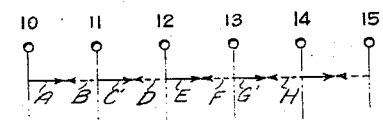
Figure 29A:
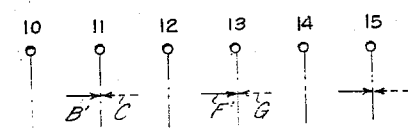
Figure 29B:
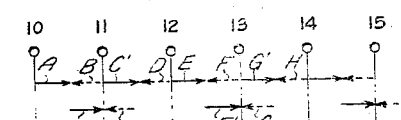

Referring now to Figures 29 and 26a, Figure 29 shows the continuous coverage obtained from shooting from shot holes 10, 11, 11, 12, 12, 13, 13, etc., obtaining the records A, B, C', D, E, F, G', H from the succession of first steps of the method of Figure 26a. Figure 29a shows the partial coverage obtained by shooting from shot holes 12, 10, 14 and 12 of the second steps of the method shown in Figure 26a obtaining the records B', C, F', G. Figure 29b shows the combination of records obtained from both steps of the method in Figure 26a showing the double coverages obtained under shot holes 11, 13, 15, etc.

It will be apparent to those skilled in the art that our method of multiple coverage reflection seismic surveying is of value not only for the purpose of obtaining a continuous chain of correlatable reflection points along and on the reflecting horizon, as pointed out above, but that errors due to wave interference and near surface conditions such as topography and variable near surface weathering are averaged out. The reason for this is that each set of data at a particular point is derived from different combinations of wave paths or from different shot points and receiver combinations. For example, referring to point I' of Figure 22 under shot point 13, this reflecting point can be computed from the vertical reflection involving weathering and elevation at shot point 13, giving time point I' and also from the reflections between shot points and receivers at shot points 12 and 14 with weathering and elevations at these points, giving time point III'.

The most comprehensive methods may be used in geophysical exploration by reflection seismograph methods without yielding, in certain areas, reliable geological information. We have discovered that this is due to velocity variations which take place in these certain areas and by combining multiple coverage shooting with velocity determinations that accurate results are obtained.

Figure 30:
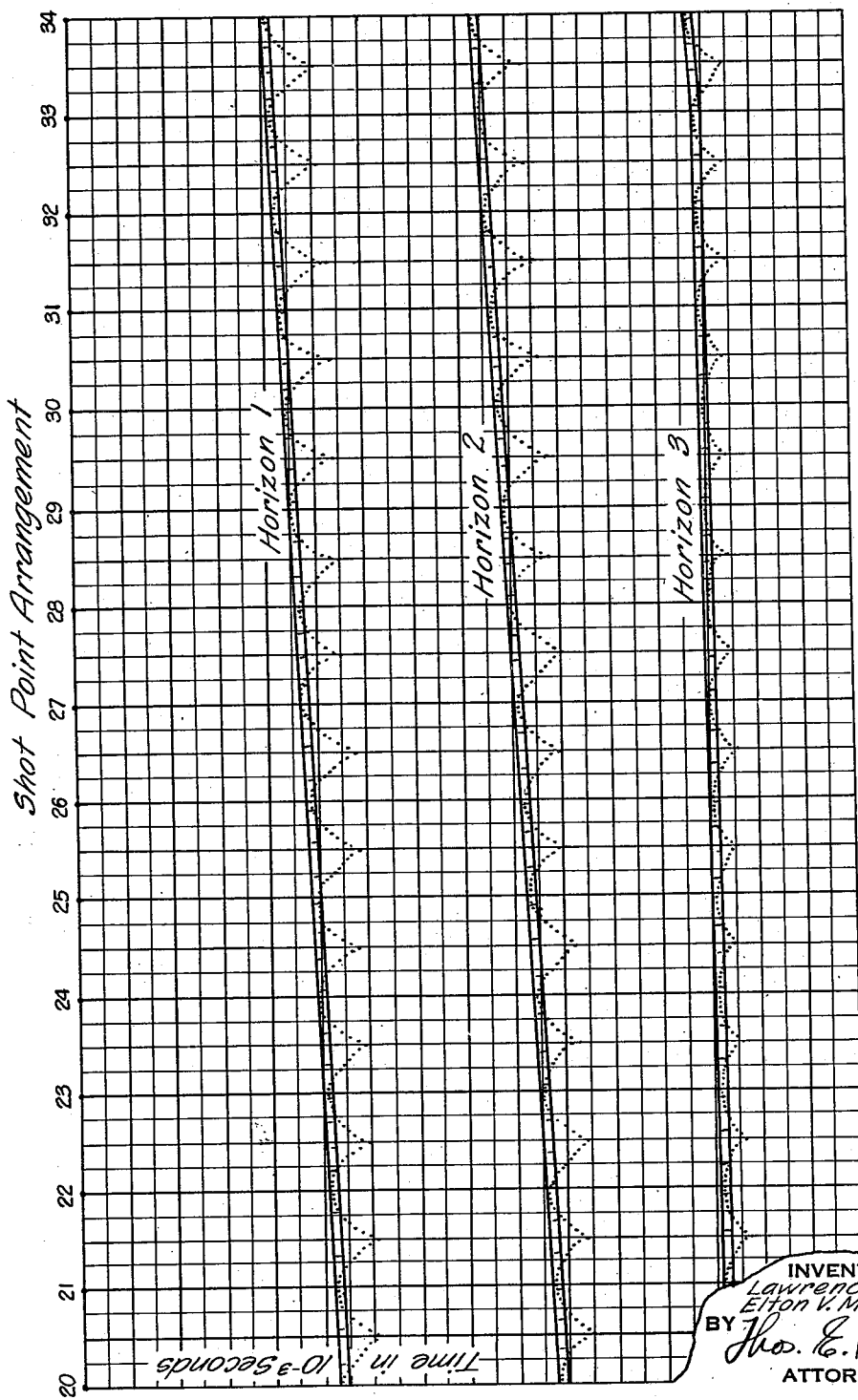
Figure 30 is a time cross section along another series of shot holes taken by the method shown in Figure 18, in which time is plotted with respect to half the distance.

Referring now to Figure 30, we have shown a time cross section over a series of shot holes from 20 to 34 inclusive. The travel times have been plotted and three apparent horizons indicated as horizons 1, 2, and 3 respectively are shown. If the velocity of seismograph wave travel were uniform over the area represented and lying between shot holes 20 and 34, the horizons as shown would be indeed true representations of the subsurface structure.

The velocity for a general case, however, is not constant laterally from one shot point to another and the comprehensive exploration method of our invention makes velocity determinations in conjunction with reflection surveying and plots the structure taking velocity variations into account.

Figure 31:
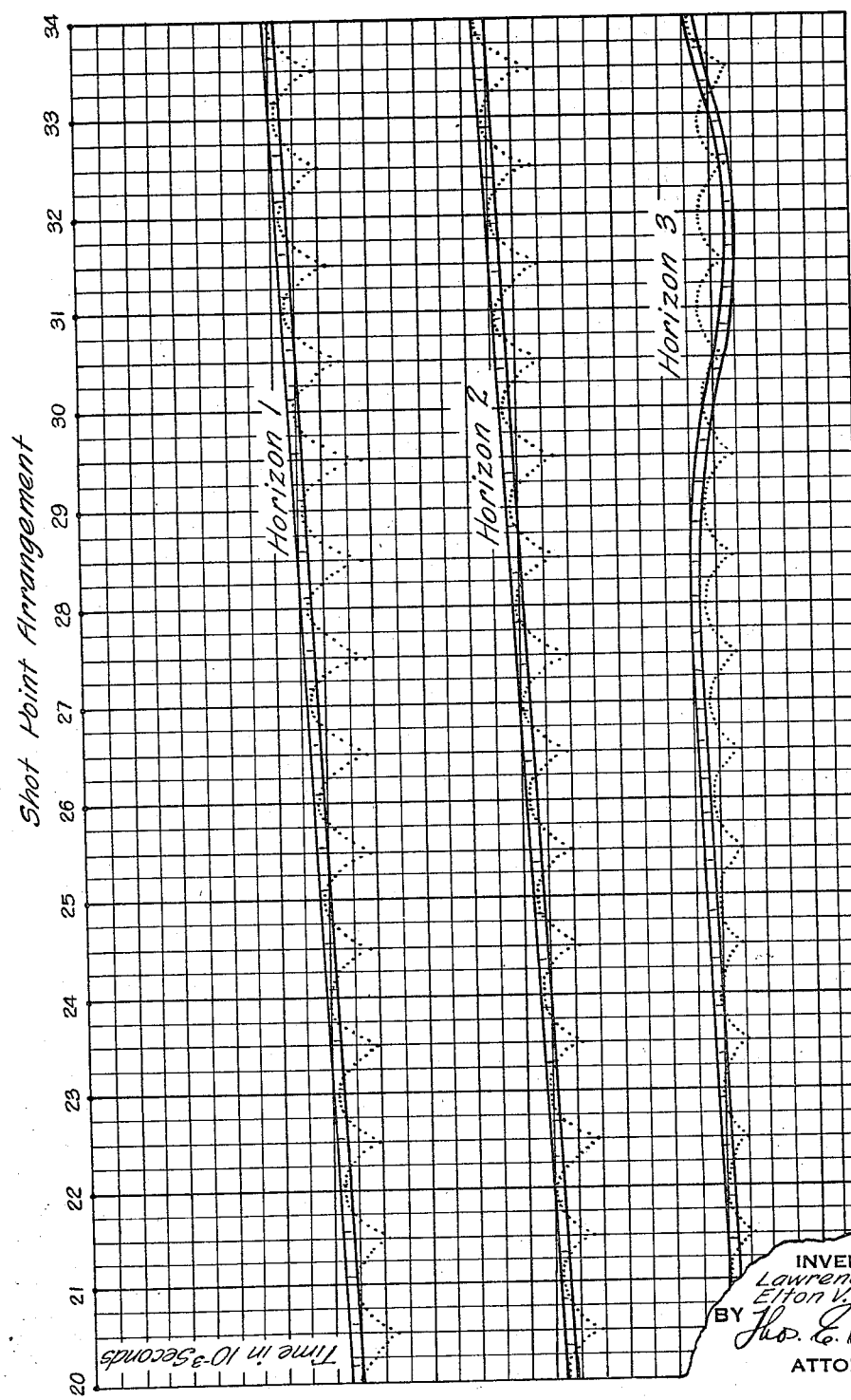
Figure 31 is another time cross section taken along the same series of shot holes as shown in Figure 30 in which time is plotted with respect to half the distance obtained by employing a corrected velocity and disclosing the true shape of the subsurface formations in distinction to the apparent and erroneous shape shown in Figure 30.

Referring now to Figure 31, the same time cross section as shown in Figure 30 is again illustrated and it will be noted that the series of dots representing travel times are the same. The velocity, however, of seismic wave travel between shot holes 30 and 34 in the region of horizon 3 was generally faster and variable. It was greatest substantially below shot hole 32. Taking into account the varying velocity obtained by making simultaneous velocity determinations, the true shape of horizon 3 between shot holes 30 and 34 may be plotted. It will be seen that the bed dips, that is it occupies a greater depth than the apparent bed shown in Figure 30. Similarly, the velocity between shot holes 24 and 30 was somewhat slower than the average velocity, and varying. Taking into account the local velocity in the region of each shot hole, the true shape of horizon 3 can be drawn. Due to the fact that the velocity was slower than presumed in Figure 30, the horizon 3 is somewhat shallower than originally drawn with the assumed velocity and the result is that the true shape of horizon 3 is yielded. The velocity in horizons 1 and 2 were found to be substantially constant so that the assumption made in Figure 31 discloses the true shape of these horizons. It will be noted, too, that it makes no difference what the actual velocity is in determining the shape or contour of the various subsurface strata. An error in velocity will result only in locating the bed at the wrong depth. If the changes of velocity laterally along the stratum are correctly ascertained, then the true shape of the various strata will likewise be revealed.

In geophysical exploration for the location of oil deposits, the thing of paramount importance is the shape of a particular horizon in order to establish the probability of an accumulation of oil, rather than to establish the particular depth at which the horizon is situated.

In order to perform seismic operations which will provide data from which velocity, as well as dip, depth or divergence may be determined accurately, certain conditions of shot point and seismometer arrangements must be met. The instruments must be placed so as to provide accurate data for topographic and near-surface weathering corrections, both for velocity and dip, depth or divergence calculations. Records or combinations of records must be provided over seismometer spreads or a line of reflecting points in excess of 3,000 feet in length or in the vicinity of the critical outer distances at which reflections may be received, in order to accurately compute velocity. At the same time, a plurality of records over shorter spreads less than 3,000 feet in length and preferably from 1,000 to 2,000 feet over a comparatively short line of reflecting points must be obtained for proper and desirable dip, depth or divergence determinations of structure.

To obtain these apparently antithecal results, we employ a series of spaced shot points less than 3,000 feet apart and lines of spaced seismometers of considerable length. We then record variable series of shots from each hole at diverse seismometer spreads or a series of shots at each seismometer spread from diverse shot holes according to the methods pointed out above in obtaining multiple coverage. These operations provide short spreads giving records for dip, datum or divergence determinations. The method is such that the series of short spreads having a common reflected path on the various successive records enables us to obtain the equivalent of a long spread, that is, one over 3,000 feet in length or approaching a critical outer distance at which reflections may be received, from which long spread accurate velocity determinations may be made. At the same time, the determinations of dip, datum and divergence may be made from the short spreads.

Any of the methods of Figure 21a, 23a, 25a, 26a, or 27a may be employed. It will be seen that these methods are such that two successive short records may be for determining dip, datum and divergence and have a common reflected wave path or substantially common reflected wave path, enabling ready correlation from record to record to be made. The maintenance of an equivalent wave path from record to record has the result of converting the series of records into the equivalent of one long continuous record over the spread of at least 3,000 feet, from which accumulative record accurate velocity determinations may be made.

Figure 32:
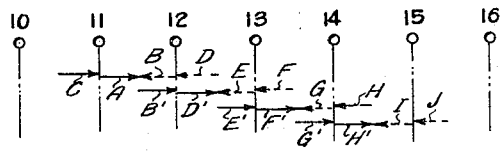
Figure 32 is a diagrammatic view showing one method of combining records from which velocity determinations by the method shown in Figure 21a may be made.

Referring now to Figure 32, it will be seen that record C contains a trace of a wave path reflected from a point substantially under shot hole 11. Similarly, record A contains a trace of a wave path reflected from substantially the same point under shot hole 11. Record C can be readily correlated with record A.

Referring again to Figure 32, we have shown one mode of combining records to obtain the equivalent of a long spread for use in making velocity determinations. Record C and record A are shown to give continuous coverage from a point between shot holes 10 and 11 to a point between shot holes 11 and 12. Record B has a reflection from a point midway between shot holes 11 and 12. So has record A. Accordingly, therefore, record B can be correlated with record A. Record B has a reflection from a point directly under shot hole 12. So has record D. Accordingly, records B and D can be readily correlated. Figure 32 shows the plurality of chains of records similar to C, A, B, D, made by the method of shooting in Figure 21a. Each chain of records can be considered as one continuous record, it being understood that the distance between shot holes 10 and 13 in this case is at least 3,000 feet.

Figure 32A:
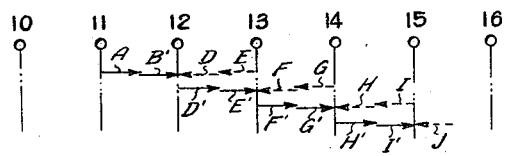
Figure 32a is a diagrammatic view showing another method of combining records from which velocity determinations by the method shown in Figure 21a may be made.

Referring now to Figure 32a, we have shown another mode of combining the records obtained by the mode of shooting in Figure 21a to obtain the equivalent of one long record. Record A contains the reflection directly under the midpoint between shot holes 11 and 12. Record D' likewise contains a reflection directly under shot hole 12. Record D contains a reflection from a point directly under shot hole 12 on the reflecting horizon 2, that is the same reflecting horizon from which all the records were made. Records B' and D can thus be readily correlated. Record D contains a reflection from the reflecting horizon beneath the midpoint between shot holes 12 and 13. Record E likewise contains a reflection from the reflecting horizon underneath the midpoint between shot holes 12 and 13. Records D and E may, therefore, be readily correlated. The continuous chain of records A, B', D and E being made from a spread over 3,000 feet in length can be used as one record for the purpose of making velocity determinations. Similarly, chains D', E', F, G and F", G, H, I give the effect of continuous records for which velocity determinations may be made.

Figure 32B:
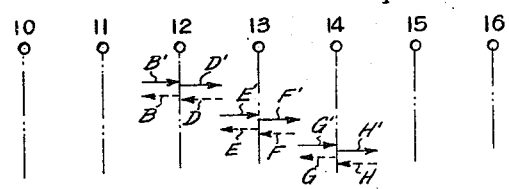
Figure 32b is a view similar to Figures 32 and 32a showing a further method of combining records from which velocity determinations by the method shown in Figure 21a may be made.

Figure 32b shows still another mode of combining records from which greater accuracy may be obtained. Records B' and D' and records B and D are from the same reflecting segment, but up-dip and down-dip respectively. Similarly, record E' and F", and E and F are from the same reflecting segment but up-dip and down-dip respectively. Record B' contains a reflection from beneath shot hole 12. Record D' contains a reflection from beneath shot point 12. Records B' and D' may be, therefore, correlated. Similarly records B and D may be correlated and the results averaged. Record D' contains the reflection from a point on the reflecting horizon underneath the midpoint between shot holes 12 and 13. Similarly, record E' contains a reflection from the reflecting horizon beneath the midpoint between shot holes 12 and 13. Record E' may be therefore correlated with record D'. Record E' contains a reflection from beneath shot hole 13. Record F' contains a reflection from beneath shot hole 13. Record F' may be therefore correlated with record E'. Records E and F may be likewise correlated and record E may be correlated with record D. The process may be continued from record to record to obtain the equivalent of a continuous record whose length is the equivalent of that which would be obtained from a single seismometer spread extending over 3,000 feet in length, from which velocity determinations may be made.

There are other advantageous combinations of records which can be used for velocity calculations in addition to those illustrated. They are particularly valuable in computing several velocity values along the same general profile in order that several determinations of velocity may be made, the average of which is especially reliable. Referring to Figures 21 and 21a, several of these combinations may be pointed out—(1) wing spread, such as combination of records B and D', (2) between hole spreads such as combination of records D' and E, (3) the combination of B and B', and (4) the combination of D and D'. The last two are illustrated in Figure 7. In each of the four cases a simple dip formula is applicable that is free from velocity errors.

Still another combination of records from the method of shooting illustrated in Figures 21 and 21a has proved extremely useful. A combination of four records, such as B, B', D and D' of Figure 21a closes a loop of zero width on the reflecting beds. Such a loop of four records reverses a trace on the reflecting bed more exactly than a simple combination of two records, and takes advantage of a large effective difference between X₁ and X₂, yet the reflecting points are confined to a limited reversed segment.

Figure 33:
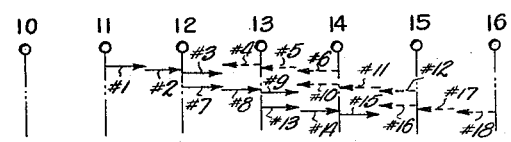
Figure 33 is a diagrammatic view showing one method of combining records of reflections obtained by the method of shooting shown in Figure 23a from which velocity determinations may be made.

Referring now to Figure 33 and considering this figure in connection with Figure 23a, it will be seen that record #1 contains a reflection from the reflecting stratum beneath the mid-point between shot points 11 and 12. Record #2 likewise contains a reflection from the reflecting stratum beneath the mid-point between shot holes 11 and 12. Records #1 and #2 may be correlated by reason of the reflection from the common point on the reflecting stratum. Since records #1 and #2 have a reflecting point in common, and since the distance between shot point and receiving position is known in each case, given the travel time on one record, then the travel time on the other to the common reflecting point can be calculated and the common reflection identified therefrom.

It is to be understood, of course, that exact correlation is not essential to our method of determining velocities. In areas where records are not readily correlatable, velocity may be obtained from combinations of increments in travel times taken from substantially the same time zone on the records involved.

Record #2 contains a reflection directly under shot hole 12. Record #3 likewise contains a reflection from the same reflecting point underneath shot hole 12. Records #2 and #3 may be therefore correlated. Record #3 contains a reflection from the reflecting stratum midway between shot holes 12 and 13. Record #4 likewise contains a reflection from the reflecting stratum between shot holes 12 and 13. Records #3 and #4 may therefore be correlated. Record #4 contains a reflection from the reflecting stratum underneath shot hole 13. Record #5 contains the reflection from the reflecting stratum beneath shot hole 13. Records #4 and #5 may therefore be correlated. Record #5 contains a reflection from the mid-point between shot holes 13 and 14. Record #6 contains a reflection from the mid-point between shot holes 13 and 14. Record #6 contains a reflection from the mid-point between shot holes 13 and 14. Records #5 and #6 may be therefore readily correlated. By referring to Figure 33, it will be seen that records #1, #2, #3, #4, #5, and #6 give a continuous chain of records extending along the reflecting stratum between shot holes 11 and 14. The individual records may be used to compute dip, datum, and divergence, while the resulting record obtained by the series of records 1 to 6 inclusive, is the equivalent of a long spread from which velocity determinations may be made. Similarly, records #7, #8, #9, #10, #11, and #12 may be combined. In the same manner, records #13, #14, #15, #16, and #17 and #18 may be combined to give a record from which velocity determinations may be made. It will be seen that the reflecting segment between shot holes 12 and 13 is such that double velocity determinations may be made, while in the area between shot holes 13 and 14, triple velocity determinations may be made, resulting in very accurate velocity data.

Figure 33A:
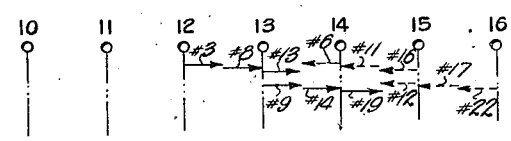
Figure 33a is a view similar to Figure 33, showing another method of combining records obtained by shooting as shown in Figure 23a for obtaining velocity determinations.

Figure 33a shows another manner of combining records made by the method of shooting shown in Figure 23a to obtain an equivalent velocity record, that is, one having a long spread approaching the critical distance from which identifiable reflections can be made, that is generally a spread of at least 3,000 feet in length. Records #3, #8, #13, #6, #11, and #16 may be combined to give the equivalent of a long record, giving continuous coverage between shot holes 12 and 15. Similarly, records #9, #14, #19, #12, #17, and #22 may be combined to give the equivalent of a long record from which velocity determinations may be made and giving multiple velocity coverage when considered with the previous record over substantially the same area.

Figure 33B:
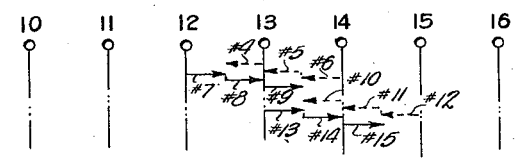
Figure 33b is a diagrammatic view showing still another method of combining records obtained by shooting in accordance with the method shown in Figure 23a from which combination of records velocity determinations may be made.

Figure 33b discloses another mode of combining the records made by the method of shooting shown in Figure 23a in order to make velocity calculations from overlapping subsurface spreads. Records #4, #5, and #6 may be readily correlated to form the equivalent of a long spread inasmuch as records #4 and #5 contain reflections from a common point and records #5 and #6 contain reflections from a common point. Records #7, #8, and #9 may be likewise combined since record #7 has a reflection from a common point with record #8, and record #8 has a reflection from a common point with record #9. Records #4, #5 and #6 may be considered together with records #7, #8 and #9 to give the equivalent of a long record between shot holes 12 and 13, giving overlapping substrata coverage in the vicinity of shot hole 13. Similarly, records #10, #11, and #12 may be used with records #13, #14, and #15. By reference to Figure 33b, it will be seen that triple subsurface velocity coverage having overlapping determinations is thus obtained in the region between shot holes 13 and 14.

Figure 34:
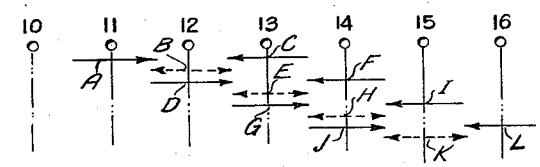
Figure 34 is a diagrammatic view showing one method of combining records by the method of shooting shown in Figure 25a, from which double coverage velocity determinations may be made.

Referring now to Figure 34, we have shown one method of combining the records obtained by the method of shooting in Figure 25a to give double substrata velocity coverage. Record A contains a reflection from the mid-point between shot holes 11 and 12 and may therefore be correlated with record B, which contains a similar reflection. Record B contains a reflection from the mid-point between shot holes 12 and 13, and thus may be correlated with record C, which contains a similar reflection. Records A, B and C together may be considered as a single record for making velocity determinations. Similarly, records D, E, and F may be combined. Likewise records G, H, and I may be combined, as may records J, K, and L. It will be seen that double velocity determinations are had under shot hole 12, while triple velocity determinations are had under shot holes 13 and 14.

Figure 35 shows a line of shot holes, while Figure 35a shows a method of shooting to give continuous coverage for making dip, datum, and divergence calculations, as well as velocity determinations. With a spread of seismometers from the mid-point between shot holes 10 and 11 to the mid-point between shot holes 11 and 12, a shot is fired from shot hole 11, giving records A and B on the reflecting stratum 2, both up-dip and down-dip. The seismometers are then spread from shot hole 10 to the mid-point between shot holes 10 and 11 and from shot hole 12 to the mid-point between shot holes 11 and 12, and a second shot fired from shot hole 11. This gives records C and D. Seismometers are then moved to extend on the other side of shot hole 12 so that a spread between the mid-point between shot holes 11 and 12 and the mid-point between shot holes 12 and 13 is formed. A shot is then fired from shot hole 12 and records E and F obtained. The seismometers are then spread to extend from shot hole 11 to the mid-point between shot holes 11 and 12, and from shot holes 13 to the mid-point between shot holes 12 and 13, and another shot fired from shot hole 12. This gives records G and H. The seismometers are then spread symmetrically with respect to shot hole 13 and records I and J are made. The seismometers are then spread in two groups, one extending from shot hole 12 to the mid-point between shot holes 12 and 13, and the other extending from shot hole 14 to the mid-point between shot holes 13 and 14. Another shot is then fired from shot hole 13 and records K and L made. The seismometers are then spread symmetrically with respect to shot hole 14 in the same manner as described, and records M and N made. Seismometers are then spread to extend from shot hole 13 to the mid-point between shot holes 13 and 14, and from shot hole 15 to the mid-point between shot holes 14 and 15, and records O and P made.

Referring to Figure 36, it will be seen that record A may be combined with record B; record E may be combined with record F; record I may be combined with record J; record M may be combined with record N, etc. Likewise, record D may be combined with record G; record H may be combined with record K; record L may be combined with record O, etc. The series of records, A—B, D—G, E—F, A—K, I—J, L—O, M—N gives continuous coverage in the making of velocity determinations.

Figure 36a shows another mode of combining records of the method of shooting shown in Figure 35a. Record C contains a reflection from adjacent shot hole 11; record A contains a reflection from the identical point. Records C and A may be therefore correlated. Record A contains a reflection underneath shot hole 11. Record B contains a similar reflection; and records A and B may be therefore correlated. Record B contains a reflection adjacent shot hole 11. Record D contains a reflection from the identical point. Records B and D may be therefore correlated. The chain of correlatable records is shown in Figure 36a and it will be clear to those skilled in the art that the manner of combining records shown enables continuous velocity coverage to be obtained.

Figure 37 shows the coverage obtained by shooting from the first steps of the method shown in Figure 35a.

Figure 37a shows the coverage obtained by shooting the second steps of the method shown in Figure 35a.

Figure 37b shows the manner of combining records of both steps of the method of shooting in Figure 35a to obtain continuous coverage, the individual records being employed for making dip, datum, and divergence determinations.

It will be seen that we have accomplished the objects of our invention. We have provided a method for determining velocities of the travel of seismic waves, which eliminates error due to surface weathering conditions and variable topography. Our method has the advantage of long, effective distances between shot points and recorders whereby we are enabled to provide the largest possible time differences in the length of critical reflection paths and thus obtain an accurate velocity determination. Our method, furthermore, has the advantage of a plurality of paths with attendant times to be used as averages resulting in accuracy. Our method, furthermore, is such that errors in velocity determinations contributed by differences in velocity occurring locally are reduced or eliminated. We have provided a method in which, by shooting and recording profiles in reverse direction, both up-dip and down-dip over a length of the reflecting horizon; or both up-dip and down-dip on adjacent lengths of the reflecting horizon, the errors due to unknown dip are substantially eliminated. By means of our method we are enabled to predict small changes in velocity with considerable precision.

We have provided a method of multiple coverage shooting for dip, datum and divergence whereby we are enabled to establish the contour shape, size and configuration of the substrata with great completeness, detail and accuracy. We have provided a comprehensive method of obtaining multiple time patterns from a single reflecting horizon whereby the accumulation of data permits many checks and re-checks of travel times from a given substrata point to be made, whereby we are enabled to average out errors due to wave interference and variable near-surface conditions. By means of our method, both accurate determinations of dip, datum, and divergence and the velocity of the travel of seismic waves may be made simultaneously. This enables us to determine the true shape of the substrata which is of paramount importance in geophysical prospecting, in order to establish the probability of the accumulation of oil.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A method of reflection seismic surveying for determining the velocity of travel of seismic waves from adjacent the surface of the earth through the earth to at least one reflecting stratum, including the steps of successively generating seismic waves at two separate sources spaced apart substantially as far as reflections can be recorded, receiving seismic waves generated at the first source after reflection from said reflecting stratum at seismometers located adjacent each of said seismic wave sources, receiving seismic waves generated at said second source after reflection from said reflecting stratum at seismometers located adjacent each of said seismic wave sources, measuring the time of travel of the seismic wave from the first source to the reflecting stratum and back to the seismometer located adjacent said first source, measuring the time of travel of a seismic wave from said second source to the reflecting stratum and back to the seismometer located adjacent said second source, averaging said times of travel, measuring the time of travel of a seismic wave from one of said seismic wave sources to the seismometer adjacent the other of said sources and determining the velocity of the travel of seismic waves from the travel times thus obtained.

2. A method of reflection seismic surveying for determining the velocity of travel of seismic waves from adjacent the surface of the earth through the earth to at least one reflecting stratum, including the steps of successively generating seismic waves at two separate sources spaced apart at least 3,000 feet, receiving seismic waves generated at the first source after reflection from said reflecting stratum at seismometers located adjacent each of said seismic wave sources, measuring the time of travel of the seismic wave from the first source to the reflecting stratum and back to the seismometer located adjacent said first source, measuring the time of travel of a seismic wave from said second source to the reflecting stratum and back to the seismometer located adjacent said second source, averaging said times of travel, measuring the time of travel of a seismic wave from one of said seismic wave sources to the seismometer adjacent the other of said sources and determining the velocity of the travel of seismic waves from the travel times thus obtained.

3. A method as in claim 1 in which a plurality of seismometers are spaced between said seismometers adjacent said seismic wave sources and reflections received at said intermediate seismometers.

4. A method of reflection seismic surveying for determining the velocity of travel of seismic waves from adjacent the surface of the earth to at least one reflecting stratum, including the steps of successively generating seismic waves at two separate sources spaced approximately the maximum distance at which reflected seismic waves may be recorded, receiving seismic waves generated at the first source after reflection from said reflecting stratum at seismometers located adjacent each of said seismic wave sources, receiving seismic waves generated at said second source after reflection from said reflecting stratum at seismometers located adjacent each of said seismic wave sources, there being a plurality of seismometers spread between said first and second seismometers and a third seismic wave source between said first and second seismic wave sources, receiving seismic waves from said first source reflected from said reflecting stratum at said intermediate seismometers, receiving seismic waves reflected from said second seismic wave source at said intermediate seismometers, receiving seismic waves from said third seismic wave source at all of said seismometers, measuring the time of travel of the seismic wave from the first source to the reflecting stratum and back to the seismometer located adjacent said first source, measuring the time of travel of a seismic wave from said second source to the reflecting stratum and back to the seismometer located adjacent said second source, averaging said times of travel, measuring the time of travel of a seismic wave from one of said seismic wave sources to the seismometer adjacent the other of said sources and determining the velocity of the travel of seismic waves from the travel times thus obtained.

5. A method as in claim 1 in which a line drawn through said seismic wave sources and a line drawn through said seismometers are spaced from each other and substantially parallel.

6. A method as in claim 1 in which a plurality of seismometers are spread between said first and second seismic wave sources in a series of groups, there being a common seismometer in each group and a succession of seismic waves are generated from said first source and received at each group in succession until the distance between said first source and said second source is covered and then the process repeated with a plurality of seismometer spreads starting adjacent said second source and extending toward said first source, using a succession of seismic waves generated at said second source.

7. A method of reflection seismic surveying for determining the velocity of seismic waves from adjacent the surface of the earth to at least one reflecting stratum, using a seismometer spread extending symmetrically from a seismic wave source in opposite directions to substantially the limit at which reflected seismic waves may be recorded, including the steps of generating seismic waves at said seismic wave source, receiving seismic waves generated at said seismic wave source after reflection from said reflecting stratum at a seismometer located adjacent said seismic wave source, receiving seismic waves generated at said seismic wave source after reflection from said reflecting stratum at the seismomoters located most remote from said seismic wave source, measuring the travel times from said seismic wave source to each of said seismometers located most remote from said seismic wave source, averaging said travel times, measuring the travel time from said seismic wave source to the seismometer located adjacent said seismic wave source and determining the velocity of travel of seismic waves from the travel times thus obtained.

8. A method as in claim 7 in which said seismic wave source lies on the perpendicular bisector of the line of seismometers.

9. A method as in claim 7 in which said line of seismometers extends around a circle whose radius is at least 3,000 feet.

10. A method as in claim 7 in which said line of seismometers extends around a circle whose radius is at least 3,000 feet and in which a line of seismometers extends along a radius of said circle and seismic waves are received along said radius as well as around the circumference of said seismometers.

11. A method as in claim 7 in which the seismometer spread is formed by two groups of seismometers one extending in one direction from the seismic wave generation point and the other extending in the opposite direction from the seismic wave generation point, and seismic waves are generated successively and recorded at each of said groups of seismometers in succession.

12. A method of reflection seismic surveying for determining the velocity of travel of seismic waves from adjacent the surface of the earth through the earth to at least one reflecting stratum, including the steps of generating seismic waves at a first seismic wave source, receiving the seismic waves at at least two seismometers one positioned adjacent the seismic wave source and a second removed from the seismic wave source substantially as far as reflections can be recorded, then generating seismic waves at a source positioned adjacent said second seismometer and receiving seismic waves generated at said second seismic wave generation source at a third seismometer located adjacent said second seismic wave generation source, measuring the travel time of seismic waves from said first source to the reflecting stratum to said first seismometer, measuring the travel time of seismic waves from said second seismic wave source to said reflecting stratum to said third seismometer, averaging said travel times, measuring the travel time from said first seismic wave source to said second seismometer, determining the velocity of travel of seismic waves from the travel times thus obtained.

13. A method of reflection seismic surveying for determining the velocity of travel of seismic waves from adjacent the surface of the earth through the earth to at least one reflecting stratum, using two sources of seismic waves spaced apart substantially as far as reflected seismic waves can be recorded, including the steps of generating seismic waves at said first seismic wave source, receiving seismic waves generated at said first source after reflection from said reflecting stratum at at least two seismometers, the first located adjacent said seismic wave source and the second located intermediate said seismic wave sources, then generating seismic waves at said second seismic wave source and receiving seismic waves generated at said second seismic wave source after reflection from said reflecting stratum at a third seismometer located adjacent said second seismometer and at a fourth seismometer located adjacent said second seismic wave source, measuring the time of travel of seismic waves from said first seismic wave source to said reflecting stratum to said first seismometer, measuring the time of travel of seismic waves from said second seismic wave source to the reflecting stratum to said fourth seismometer, averaging said travel times to obtain a first average travel time, measuring the time of travel of seismic waves from said first seismic wave source to the reflecting stratum to said second seismometer, measuring the time of travel from said second seismic wave source to the reflecting stratum to said third seismometer, averaging said last two times of travel to obtain a second average time of travel, determining the velocity of seismic waves from the travel times thus obtained.

14. A method as in claim 12 in which there are a plurality of seismometers spread between said first and second seismometers.

15. A method as in claim 12 in which there are a plurality of seismometers spread between said first and second seismometers and the method is repeated with a second spread of seismometers and a third and fourth seismic wave source, a line joining said first and second seismic wave sources intersecting the line joining said third and fourth seismic wave sources.

16. A method as in claim 12 in which a line drawn through said first and second seismic wave sources is spaced from and parallel to a line drawn through said first and second seismometers.

17. A method as in claim 12 in which a plurality of seismometers are spread between said first and second seismometers and a line drawn through said seismometer spread is spaced from and parallel to a line drawn through said first and second seismic wave source and the method is repeated along lines of seismometers forming a polygon.

18. A method of reflection seismic surveying using three groups of seismometers extending substantially in line with each other and being substantially equal in length and two seismic wave sources, the first being positioned between said first group of seismometers and said second group of seismometers and the second seismic wave source being positioned between said second group of seismometers and said third group of seismometers, generating seismic waves at said first seismic wave source and receiving seismic waves generated at said first source after reflection from a reflecting stratum at the seismometer of said second group adjacent said first seismic wave source and at the seismometer of the third group most remote from said first seismic wave source, then generating seismic waves at said second seismic wave source and receiving seismic waves at the seismometer of said second group adjacent said second seismic wave source and at the seismometer of said first group most remote from said second seismic wave source, measuring the travel times of said reflected seismic waves and using said travel times to determine the velocity of travel of seismic waves, the distance between the first seismometer of said first group and the last seismometer of said third group being at least 3,000 feet.

19. A method as in claim 18 in which reflections are recorded at the intermediate seismometers of each group and said reflections used to determine dip, datum, or divergence.

20. A method of reflection seismic surveying for determining the velocity of travel of seismic waves from adjacent the surface of the earth through the earth to at least one reflecting stratum, including the steps of generating seismic waves at a first source, receiving seismic waves at a first group of seismometers spaced from said first source, then generating seismic waves at a second seismic wave source positioned centrally of said first group of seismometers and receiving seismic waves at a second group of seismometers positioned symmetrically to said first seismic wave source, the distance between said first seismic wave source and said second seismic wave source being at least 3,000 feet.

21. A method of reflection seismic surveying for determining the velocity of travel of seismic waves from adjacent the surface of the earth through the earth to at least one reflecting stratum, using at least two seismometers spaced apart more than 3,000 feet and a seismic wave source, including the steps of generating seismic waves at said seismic wave source and receiving said seismic waves at both said seismometers after reflection from said reflecting stratum, one of said seismometers being positioned adjacent said seismic wave source and the other of said seismometers being removed from said seismic wave source, determining the velocity of travel of seismic waves from the expression;

$$V=\sqrt{\frac{X_1^2-X_2^2}{T_1^2-T_2^2}}$$

in which V is the velocity to be determined, $X_1$ is the distance from the seismic wave source to the seismometer most remote therefrom, $X_2$ is the distance from the seismic wave source to the seismometer adjacent thereto, $T_1$ is the time of travel from the seismic wave source to the reflecting stratum to the seismometer most remote from the seismic wave source, and $T_2$ is the time of travel from the seismic wave source to the reflecting stratum to the seismometer adjacent said seismic wave source.

22. A method as in claim 21 in which there are a plurality of additional seismometers between said first and second seismometers and reflections from said reflecting stratum are received by said additional seismometers.

23. A method as in claim 21 in which said seismic waves are received at said seismometers at different times and in which a group of seismometers extending from said first seismometer toward said second seismometer through a fraction of the distance therebetween is first placed and seismic waves generated at said first source and received at said first group of seismometers, then a second group of seismometers having one seismometer positioned in common with a seismometer of said first group is placed and seismic waves again generated from said seismic wave source and received at said second group of seismometers, and the foregoing steps thus repeated with a plurality of successive seismometer groups and a plurality of successive seismic wave generation steps until the distance been said first seismometer and said second seismometer is traversed, the plurality of individual records thus made being correlatable from one seismometer group to the next, whereby the shortest travel time on the first record and the longest travel time on the last record may be used to determine velocity and the individual records be used to determine dip, datum and divergence.

24. A method of reflection seismic surveying using a line of shot holes and a plurality of seismometer spreads, including the steps of positioning a seismometer spread between a second and third shot hole, generating seismic waves at a first shot hole and receiving seismic waves after reflection from a reflecting stratum at the seismometer spread, then generating seismic waves at said second shot hole and receiving said seismic waves after reflection from said reflecting stratum at said seismometer spread, generating seismic waves at said third shot hole and receiving said seismic waves after reflection from said reflecting stratum at said seismometer spread, then generating seismic waves from a fourth shot hole and receiving said seismic waves at said seismometer spread after reflection from said reflecting stratum, then moving said seismometer spread between said third and fourth shot holes and continuing the process along the line of shot holes, the distance between said first and third shot holes being at least 3,000 feet, the method being such that the series of records made at the seismometer spreads from the series of shots are readily correlatable and give records of a plurality of reflections from substantially the same reflecting stratum whereby multiple determinations of the velocity of travel of seismic waves and multiple determinations of dip, datum and divergence may be made.

25. A method of reflection seismic surveying using a line of spaced shot holes, including the steps of spreading a plurality of seismometers between a third and fourth shot hole, generating seismic waves at a first shot hole and receiving said seismic waves at said seismometer spread after reflection from a reflecting stratum, then generating seismic waves at a second shot hole and receiving seismic waves after reflection from a reflecting stratum at said line of seismometers, then generating seismic waves at a third shot hole and receiving seismic waves along said line of seismometers after reflection from a reflecting stratum, then generating seismic waves at a fourth shot hole and receiving said seismic waves after reflection from said reflecting stratum at said seismometer spread, then generating seismic waves at a fifth shot hole and receiving seismic waves after reflection from said reflecting stratum at said seismometer spread, then generating seismic waves at a sixth shot hole and receiving reflections of said seismic waves from said reflecting stratum at said seismometer spread, then moving the seismometer spread to extend between the fourth and fifth shot holes and repeating the process using the second, third, fourth, fifth, sixth and seventh shot holes, the distance between said first and fourth shot holes being at least 3,000 feet, the method being such that the plurality of records will give multiple coverage of reflections from the same reflecting segment, whereby accurate velocity, dip, datum, and divergence determinations may be made.

26. A method of reflection seismic surveying using a line of shot holes and a plurality of seismometer spreads, including the steps of positioning a seismometer spread between a second and third shot hole, generating seismic waves at a first shot hole and receiving seismic waves after reflection from a reflecting stratum at the seismometer spread, then generating seismic waves at said second shot hole and receiving said seismic waves after reflection from said reflecting stratum at said seismometer spread, generating seismic waves at said third shot hole and receiving said seismic waves after reflection from said reflecting stratum at said seismometer spread, then generating seismic waves from a fourth shot hole and receiving said seismic waves at said seismometer spread after reflection from said reflecting stratum, then moving said seismometer spread between said third and fourth shot holes and continuing the process along the line of shot holes, the method being such that the series of records made at the seismometer spreads from the series of shots are readily correlatable and give records of a plurality of reflections from substantially the same reflecting stratum whereby multiple determinations of dip, datum, and divergence may be made.

27. A method of reflection seismic surveying using a line of spaced shot holes, including the steps of spreading a plurality of seismometers between a third and fourth shot hole, generating seismic waves at a first shot hole and receiving said seismic waves at said seismometer spread after reflection from a reflecting stratum, then generating seismic waves at a second shot hole and receiving seismic waves after reflection from a reflecting stratum at said line of seismometers, then generating seismic waves at a third shot hole and receiving seismic waves along said line of seismometers after reflection from a reflecting stratum, then generating seismic waves at a fourth shot hole and receiving said seismic waves after reflection from said reflecting stratum at said seismometer spread, then generating seismic waves at a fifth shot hole and receiving seismic waves after reflection from said reflecting stratum at said seismometer spread, then generating seismic waves at a sixth shot hole and receiving reflections of said seismic waves from said reflecting stratum at said seismometer spread, then moving the seismometer spread to extend between the fourth and fifth shot holes and repeating the process using the second, third, fourth, fifth, sixth and seventh shot holes, the method being such that the plurality of records will give multiple coverage of reflections from the same reflecting segment whereby accurate dip, datum and divergence determinations may be made.

28. A method of reflection seismic surveying using a line of spaced shot holes including the steps of positioning a seismometer spread between a second and third shot hole, and a seismometer spread between a third and fourth shot hole, then generating seismic waves at a first shot hole and receiving said seismic waves at said seismometer spreads after reflection from a reflecting stratum, then generating seismic waves at a third shot hole and receiving reflections of said seismic waves from said reflecting stratum at said seismometer spreads, then generating seismic waves at a fifth shot hole and receiving seismic waves after reflection from said reflecting stratum at said seismometer spreads, then moving the seismometer spread between the second and third shot holes to extend between the fourth and fifth shot holes while leaving the seismometer spread between the third and fourth shot holes in place, then generating seismic waves at said second shot hole and receiving seismic waves after reflection from said reflecting stratum at said seismometer spreads in their new position, then generating seismic waves at said fourth shot hole and receiving reflections of said seismic waves from said reflecting stratum at said seismometer spreads, then generating seismic waves at a sixth shot hole of the line of shot holes and receiving reflections of said seismic waves from said reflecting stratum at said spread of seismometers and then repeating the process along the line of shot holes, the method being such that the plurality of records from one seismometer spread to the next may be readily correlated and multiple reflections from the same reflecting stratum are recorded on the respective records whereby accurate determinations of dip, datum, and divergence may be made.

29. A method as in claim 28 in which the distance between said first and fourth shot holes is at least 3,000 feet whereby accurate velocity determinations may be made from a plurality of records.

30. A method of reflection seismic surveying using a line of spaced shot holes, including the steps of positioning a seismometer spread between a first and second shot hole, generating seismic waves at said first shot hole and receiving reflections thereof along said seismometer spread, generating seismic waves at said second shot hole and receiving reflections thereof along said seismometer spread, generating seismic waves at a third shot hole of the line of shot holes and receiving reflections thereof along said seismometer spread, then moving said seismometer spread to extend between said second and third shot holes, generating seismic waves at said second shot hole and receiving reflections thereof at said second seismometer spread, then generating seismic waves at said third shot hole and receiving reflections thereof at said second seismometer spread, then generating seismic waves at said first shot hole and receiving reflections thereof at said second seismometer spread, then moving said seismometer spread to extend between the third and fourth shot holes of said line of shot holes and repeating the process, the method being such that some of the records produced will contain duplicate reflections from the same reflecting segment whereby accurate determinations of dip, datum and divergence may be made.

31. A method as in claim 30 in which the distance between said first and third shot holes is at least 3,000 feet whereby accurate velocity determinations may be made.

32. A method of reflection seismic surveying using a line of spaced shot holes, including the steps of positioning seismometers between a first and second shot hole and between a second and third shot hole, generating seismic waves at said second shot hole and receiving reflections thereof along said seismometer spreads, then positioning a seismometer spread symmetrically about said second shot hole, generating seismic waves from said first shot hole and receiving reflections thereof at said second seismometer spread, generating seismic waves at said third shot hole and receiving reflections thereof at said second seismometer spread, generating seismic waves at said third shot hole and receiving reflections thereof at said second seismometer spread, then positioning seismometers between said second and third shot holes and between said third and fourth shot holes and repeating the process along said line of shot holes, the method being such that multiple reflections from portions of the reflecting stratum are recorded whereby accurate determinations of dip, datum, and divergence may be made.

33. A method as in claim 32 in which the distance between the first shot hole and the most remote seismometer of said second spread is at least 3,000 feet whereby accurate determinations of the velocity of travel of seismic waves from adjacent the surface of the earth through the earth to the reflecting stratum may be made.

34. A method of reflection seismic surveying using a line of spaced shot holes, including the steps of positioning a seismometer spread symmetrically around a second shot hole of the line of shot holes, generating seismic waves from said second shot hole and receiving reflections thereof at said symmetrical spread, then positioning a second spread of seismometers from the first shot hole of the line of shot holes to one end seismometer position of said symmetrical spread and a third spread of seismometers from the third shot hole of the line of shot holes to the other end seismometer position of the symmetrical spread, generating seismic waves at said second shot hole and receiving reflections thereof at said second and third seismometer spreads, then positioning a symmetrical spread around the third shot hole and repeating the process along the line of shot holes, the plurality of records containing reflections from successive common reflection points on the reflecting stratum whereby they may be readily correlated to give substantially continuous coverage of the subsurface stratum enabling correlatable dip, datum, and divergence determinations to be made.

35. A method as in claim 34 in which the distance between said first and third shot holes is at least 3,000 feet whereby the plurality of records may be employed for making velocity determinations.

36. A method of reflection seismic surveying for determining the velocity of travel of seismic waves from adjacent the surface of the earth through the earth to at least one reflecting stratum including the steps of generating seismic waves at a first source, receiving seismic waves along a line of seismometers extending from said seismic wave source in a predetermined direction through a distance of at least 3,000 feet, then generating seismic waves at a second seismic wave source positioned from said first seismic wave source a distance of at least 3,000 feet and receiving seismic waves generated at said second source along a line of seismometers extending from said second seismic wave source in a direction opposite to the direction of said first line of seismometers, measuring the time of travel of seismic waves generated at said first seismic wave source along the shortest seismic wave travel path, measuring the time of travel of seismic waves from said first seismic wave source along the longest seismic wave travel path, measuring the time of travel of seismic waves generated at said second seismic wave source along the shortest seismic wave travel path, measuring the time of travel of seismic waves from said second seismic wave source along the longest seismic wave travel path, and determining the velocity of the travel of seismic waves from said travel times.

37. A method of reflection seismic surveying for determining the velocity of travel of seismic waves from adjacent the surface of the earth through the earth to at least one reflecting stratum, including the steps of successively generating seismic waves at two separate sources spaced apart substantially as far as reflections can be recorded, receiving seismic waves generated at the first source after reflection from said reflecting stratum at seismometers located adjacent each of said seismic wave sources, receiving seismic waves generated at said second source after reflection from said reflecting stratum at seismometers located adjacent each of said seismic wave sources, measuring the time of travel of the seismic wave from the first source to the reflecting stratum and back to the seismometer located adjacent said first source, measuring the time of travel of a seismic wave from said second source to the reflecting stratum and back to the seismometer located adjacent said second source, averaging said times of travel, measuring the time of travel of a seismic wave from one of said seismic wave sources to the seismometer adjacent the other of said seismic wave sources, repeating the last named step in the reverse direction, averaging said last two travel times and determining the velocity of the travel of seismic waves from said averaged travel times.

38. A method as in claim 36 in which a plurality of seismometers are spaced between said seismometers adjacent said seismic wave sources and reflections received at said intermediate seismometers.

39. A method of reflection seismic surveying for determining the velocity of travel of seismic waves from adjacent the surface of the earth to at least one reflecting stratum, including the steps of successively generating seismic waves at two separate sources spaced approximately the maximum distance at which reflected seismic waves may be recorded, receiving seismic waves generated at the first source after reflection from said reflecting stratum at seismometers located adjacent each of said seismic wave sources, receiving seismic waves generated at said second source after reflection from said reflecting stratum at seismometers located adjacent each of said seismic wave sources, there being a plurality of seismometers spread between said first and second seismometers and a third seismic wave source between said first and second seismic wave sources, receiving seismic waves from said first source reflected from said reflecting stratum at said intermediate seismometers, receiving seismic waves reflected from said second seismic wave source at said intermediate seismometers, receiving seismic waves from said third seismic wave source at all of said seismometers, measuring the time of travel of the seismic wave from the first source to the reflecting stratum and back to the seismometer located adjacent said first source, measuring the time of travel of a seismic wave from said second source to the reflecting stratum and back to the seismometer located adjacent said second source, averaging said times of travel, measuring the travel time of a seismic wave from one of said seismic wave sources to the seismometer adjacent the other of said seismic wave sources, repeating the last named step in the reverse direction, averaging said travel times and determining the velocity of travel of seismic waves to a point on the reflecting stratum from said travel times.

40. A method of reflection seismic surveying for determining the velocity of seismic waves from adjacent the surface of the earth to at least one reflecting stratum, using a seismometer spread extending symmetrically from a seismic wave source in opposite directions to substantially the limit at which reflected seismic waves may be recorded, including the steps of generating seismic waves at said seismic wave source, receiving seismic waves generated at said seismic wave source after reflection from said reflecting stratum at a seismometer located adjacent said seismic wave source, receiving seismic waves generated at said seismic wave source after reflection from said reflecting stratum at the seismometers located most remote from said seismic wave source, measuring the travel times from said seismic wave source to each of said seismometers located most remote from said seismic wave source, averaging said travel times, measuring the travel times from said seismic wave source to at least two seismometers located adjacent said seismic wave source and disposed on opposite sides thereof, averaging said travel times and determining the velocity of travel of seismic waves from said average travel times.

41. A method of reflection seismic surveying for determining the velocity of travel of seismic waves from adjacent the surface of the earth through the earth to at least one reflecting stratum, including the steps of generating seismic waves at a first seismic wave source, receiving the seismic waves at at least two seismometers one positioned adjacent the seismic wave source and a second removed from the seismic wave source substantially as far as reflections can be recorded, then generating seismic waves at a source positioned adjacent said second seismometer and receiving seismic waves generated at said second seismic wave generation source at a third seismometer located adjacent said second seismic wave generation source, measuring the travel time of seismic waves from said first source to the reflecting stratum to said first seismometer, measuring the travel time of seismic waves from said second seismic wave source to said reflecting stratum to said third seismometer, averaging said travel times, measuring the time from said first seismic wave source to said second seismometer, measuring the travel time from said second seismic wave source to the seismometer positioned adjacent said first seismic wave source, averaging said travel times and determining the velocity of travel of seismic waves from said average travel times.

LAWRENCE F. ATHY.
ELTON V. McCOLLUM.